| (12) | United States Patent<br>Mori et al. | (10) Patent No.: US 11,130,518 B2<br>(45) Date of Patent: Sep. 28, 2021 |
|---|---|---|

(54) MOTOR CONTROL APPARATUS AND ELECTRIC POWER STEERING CONTROL APPARATUS EQUIPPED WITH THE MOTOR CONTROL APPARATUS

(71) Applicant: Mitsubishi Electric Corporation, Tokyo (JP)

(72) Inventors: Tatsuya Mori, Tokyo (JP); Akira Furukawa, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 16/342,006

(22) PCT Filed: Nov. 14, 2016

(86) PCT No.: PCT/JP2016/083683
§ 371 (c)(1),
(2) Date: Apr. 15, 2019

(87) PCT Pub. No.: WO2018/087917
PCT Pub. Date: May 17, 2018

(65) Prior Publication Data
US 2019/0256131 A1 Aug. 22, 2019

(51) Int. Cl.
*B62D 5/04* (2006.01)
*H02P 21/22* (2016.01)
(Continued)

(52) U.S. Cl.
CPC ........ *B62D 5/0481* (2013.01); *H02M 1/4216* (2013.01); *H02M 7/64* (2013.01);
(Continued)

(58) Field of Classification Search
CPC ......... B62D 5/0481; H02P 6/28; H02P 21/22; H02P 27/08; H02M 1/4216; H02M 7/64
See application file for complete search history.

(56) References Cited

U.S. PATENT DOCUMENTS 10,696,141 B2 * 6/2020 Kashima ............. H02P 21/0021
2002/0163319 A1 * 11/2002 Kaneko ................. B60L 15/025
318/727
(Continued)

FOREIGN PATENT DOCUMENTS

| JP | 5760830 B2 | 8/2015 |
|---|---|---|
| JP | 5954366 B2 | 7/2016 |

(Continued)

OTHER PUBLICATIONS

Notice of Reasons for Refusal dated Dec. 24, 2019 issued by the Japanese Patent Office in counterpart Application No. 2018-549742.
(Continued)

*Primary Examiner* — Peter D Nolan
*Assistant Examiner* — Wae L Louie
(74) *Attorney, Agent, or Firm* — Sughrue Mion, PLLC; Richard C. Turner

(57) ABSTRACT

When a voltage application command is outputted to a three-phase winding of one system, a d-axis proportionality constant and a q-axis proportionality constant are set with Ld and Lq, respectively, as parameters; when voltage application commands are outputted to three-phase windings of two systems, a d-axis proportionality constant and a q-axis proportionality constant are set with [Ld+Md] and [Lq+Mq], respectively, as parameters.

12 Claims, 15 Drawing Sheets

(51) Int. Cl.
  *H02M 1/42* (2007.01)
  *H02M 7/64* (2006.01)
  *H02P 27/08* (2006.01)
  *H02P 6/28* (2016.01)
  *H02M 1/00* (2006.01)

(52) U.S. Cl.
  CPC ............... *H02P 6/28* (2016.02); *H02P 21/22* (2016.02); *H02P 27/08* (2013.01); *H02M 1/0016* (2021.05)

(56) References Cited

U.S. PATENT DOCUMENTS

| | | | | |
|---|---|---|---|---|
| 2006/0038531 | A1* | 2/2006 | Wakabayashi | H02P 29/50 318/807 |
| 2008/0224645 | A1* | 9/2008 | Ide | H02P 21/18 318/608 |
| 2009/0001843 | A1* | 1/2009 | Enomoto | H02K 1/145 310/257 |
| 2009/0128069 | A1* | 5/2009 | Kaneko | B60K 6/48 318/400.09 |
| 2011/0057591 | A1* | 3/2011 | Tagome | B60L 15/20 318/400.23 |
| 2011/0234135 | A1* | 9/2011 | Kato | H02P 6/183 318/400.33 |
| 2014/0145660 | A1* | 5/2014 | Shimada | H02P 21/24 318/400.33 |
| 2015/0357956 | A1* | 12/2015 | Shimada | H02P 6/181 318/400.02 |
| 2017/0019048 | A1* | 1/2017 | Furukawa | B62D 5/046 |
| 2017/0117833 | A1* | 4/2017 | Mori | B62D 5/046 |
| 2019/0256131 | A1* | 8/2019 | Mori | B62D 5/0481 |
| 2020/0136537 | A1* | 4/2020 | Karasawa | H02K 7/006 |
| 2020/0195181 | A1* | 6/2020 | Yoshikawa | H02P 21/22 |
| 2020/0235683 | A1* | 7/2020 | Suzuki | H02P 27/08 |
| 2020/0244203 | A1* | 7/2020 | Hara | F16D 66/00 |
| 2020/0295688 | A1* | 9/2020 | Yoshikawa | H02P 21/34 |

FOREIGN PATENT DOCUMENTS

| | | |
|---|---|---|
| WO | 2015/166528 A1 | 11/2015 |
| WO | 2016/009976 A1 | 1/2016 |

OTHER PUBLICATIONS

Communication dated Sep. 19, 2019, from the European Patent Office in counterpart European Application No. 16921423.6.
Shigeo Morimoto, et al., "Principle of Energy-Saving Motor and Designing Method Therefor—from basis to design & control of Permanent-magnet synchronous motor", Jun. 2013, pp. 100-103, Maruzen Publishing Co., Ltd.
International Search Report for PCT/JP2016/083683 dated Jan. 31, 2017 [PCT/ISA/210].

* cited by examiner

MOTOR CONTROL APPARATUS AND ELECTRIC POWER STEERING CONTROL APPARATUS EQUIPPED WITH THE MOTOR CONTROL APPARATUS

CROSS REFERENCE TO RELATED APPLICATIONS

This application is a National Stage of International Application No. PCT/JP2016/083683, filed on Nov. 14, 2016.

TECHNICAL FIELD

The present invention relates to a motor control apparatus for controlling a motor provided with two systems of motor windings and to an electric power steering control apparatus equipped with the motor control apparatus.

BACKGROUND ART

To date, with regard to a motor control apparatus that controls a motor having two systems of motor windings through the intermediary of respective motor driving circuits for the system windings, based on a three-phase-current feedback method provided a current control device, there has been disclosed a motor control apparatus in which the motor inductance parameter of a current control device is switched so as to be changed in accordance with the number of driving systems for the two systems of motor windings (for example, refer to Patent Document 1).

According to Patent Document 1, especially FIG. 9, a d-axis current command value and a q-axis current command value are coordinate-transformed by use of a motor electric angle into current command values of corresponding respective phases and then are inputted to respective motor phase current control apparatuses for the two systems. Then, the motor phase current control apparatus of the corresponding system calculates the difference between the phase current command value and the phase current and then calculates the phase voltage command value, based on the difference. Therefore, the coordinate transformation (the coordinate transformation from the phase coordinate system into the rotating biaxial coordinate system or the coordinate transformation from the rotating biaxial coordinate system into three-phase coordinate system) in the motor control apparatus disclosed in Patent Document 1 can be realized by a single coordinate transformation (conversion from rotating biaxial current commands into current commands of respective phases).

In contrast, when a commonly utilized current control system on the rotating two axes is applied to a motor having two systems of windings, two coordinate transformations (the transformation from the currents of respective phases into the rotating biaxial currents and the transformation from the rotating biaxial voltages into the voltages of the respective phases) are required for each system, i.e., in the case of two systems, totally four coordinate transformations are required (e.g., refer to FIGS. 4 through 6 in Non-Patent Document 1).

Accordingly, the motor control apparatus disclosed in Patent Document 1 has an effect that it can contribute to reduction of the calculation load due to a small number of coordinate transformations, and is capable of setting parameters for obtaining an appropriate current control response in accordance with the number of driving systems.

PRIOR ART REFERENCE

Patent Document

[Patent Document 1] Japanese Patent Publication No. 5954366

Non-Patent Document

[Non-Patent Document 1] "PRINCIPLE OF ENERGY-SAVING MOTOR AND DESIGNING METHOD THEREFOR—from basis to design & control of permanent-magnet synchronous motor" by Shigeo Morimoto & Masayuki Sanada, Univ. of Osaka Prefect., Kagaku Gijutsu Shuppan, Inc. (published on June 2013), released by Maruzen Pushing Co., Ltd.

DISCLOSURE OF THE INVENTION

Problems to be Solved by the Invention

As described above, in the motor control apparatus disclosed in Patent Document 1, the coordinate transformation can be realized by a single coordinate transformation; therefore, the motor control apparatus has an advantage in terms of the calculation amount. Accordingly, the person who understands the contents disclosed in Patent Document 1 and is skilled in the art may conceive to reduce the calculation load by use of the three-phase-current feedback method disclosed in Patent Document 1, as the means for obtaining an optimum response of a current control device in accordance with the number of driving systems for a two-system motor.

However, in order to control a current flowing in a motor, it is required to detect the current by use of a current detector; in general, in many cases, the reference electric potentials (grounds) corresponding to the 0 [A] level of a three-phase current detector are set to a common (the same) electric potential and are electrically connected with one another. Accordingly, when pulsation is superimposed on the reference electric potential, noise of the same value (the same phase or zero-phase) is superimposed on the detection value of each of the three-phase currents. However, in the three-phase-current feedback method disclosed in Patent Document 1, there exist three phases and hence the in-phase noise is not cancelled; thus, there has been a problem that the ripple, the vibration, and the noise produced by the motor increase. Moreover, in a three-phase-current feedback system, the control amount is the current of each of the phases and is an AC amount. Accordingly, there has been a problem that in the case where the motor rotation speed is high and hence the frequency of the current command of the corresponding phase is high, the current of the phase cannot keep track of the command value of the phase.

The present invention has been implemented in order to solve the foregoing problems in conventional motor control apparatuses; the objective thereof is to provide a motor control apparatus that reduces a torque ripple, a vibration, and a noise sound of a motor and in which even when the motor rotation speed is high, the current of each phase can keep track of the target value, and to provide an electric power steering apparatus equipped with the motor control apparatus.

Means for Solving the Problems

A motor control apparatus according to the present invention is a motor control apparatus for controlling a permanent-magnet synchronous motor having three-phase windings of two systems that are magnetically coupled with each other; the motor control apparatus includes two respective inverters that are provided in the two systems and each of which converts DC electric power into AC electric power and applies a voltage to the three-phase winding of the system to which that inverter itself belongs, a current detector that detects a motor current flowing in the three-phase winding, and a controller that calculates a voltage command, based on the detected motor current and a motor current target value, and then controls the inverter by use of the calculated voltage command; the motor control apparatus is characterized in that letting a d axis, a q axis, Ld, Lq, Md, and Mq denote a direction of a rotor magnetic pole provided in a rotor of the permanent-magnet synchronous motor, a direction having a phase difference of 90° (electric angle) from the d axis, a d-axis self-inductance of the permanent-magnet synchronous motor, a q-axis self-inductance thereof, a d-axis inter-system mutual inductance, a q-axis inter-system mutual inductance, the controller has a d-axis current control device and a q-axis current control device, each of which calculates the voltage command by multiplying the difference between the motor current target value and the motor current by a proportionality constant, in that the current control device changes a parameter related to the proportionality constant, in accordance with the number of the systems to which the controller outputs a voltage application command, in that when the controller outputs a voltage application command to the three-phase winding of one system, the current control device sets the d-axis self-inductance Ld and the q-axis self-inductance Lq, as parameters related to the d-axis proportionality constant and the q-axis proportionality constant, and in that when the controller outputs voltage application commands to the three-phase windings of the two systems, the current control device sets the d-axis proportionality constant and the q-axis proportionality constant with [Ld+Md] and [Lq+Mq], respectively, as parameters.

An electric power steering apparatus according to the present invention includes a motor control apparatus and a permanent-magnet synchronous motor that is controlled by the motor control apparatus and generates assist torque for assisting steering by a vehicle driver; the electric power steering apparatus is characterized in that the motor control apparatus is a motor control apparatus for controlling a permanent-magnet synchronous motor having three-phase windings of two systems that are magnetically coupled with each other, and the motor control apparatus includes two respective inverters that are provided in the two systems and each of which converts DC electric power into AC electric power and applies a voltage to the three-phase winding of the system to which that inverter itself belongs, a current detector that detects a motor current flowing in the three-phase winding, and a controller that calculates a voltage command, based on the detected motor current and a motor current target value, and then controls the inverter by use of the calculated voltage command, in that letting a d axis, a q axis, Ld, Lq, Md, and Mq denote a direction of a rotor magnetic pole provided in a rotor of the permanent-magnet synchronous motor, a direction having a phase difference of 90° (electric angle) from the d axis, a d-axis self-inductance of the permanent-magnet synchronous motor, a q-axis self-inductance thereof, a d-axis inter-system mutual inductance, a q-axis inter-system mutual inductance, the controller has a d-axis current control device and a q-axis current control device, each of which calculates the voltage command by multiplying the difference between the motor current target value and the motor current by a proportionality constant, in that the current control device changes a parameter related to the proportionality constant, in accordance with the number of the systems to which the controller outputs a voltage application command, in that when the controller outputs a voltage application command to the three-phase winding of one system, the current control device sets the d-axis self-inductance Ld and the q-axis self-inductance Lq, as parameters related to the d-axis proportionality constant and the q-axis proportionality constant, and in that when the controller outputs voltage application commands to the three-phase windings of the two systems, the current control device sets the d-axis proportionality constant and the q-axis proportionality constant with [Ld+Md] and [Lq+Mq], respectively, as parameters.

Advantage of the Invention

In a motor control apparatus according to the present invention, the controller has a d-axis current control device and a q-axis current control device, each of which calculates the voltage command by multiplying the difference between the motor current target value and the motor current by a proportionality constant; the current control device changes a parameter related to the proportionality constant, in accordance with the number of the systems to which the controller outputs a voltage application command; when the controller outputs a voltage application command to the three-phase winding of one system, the current control device sets the d-axis self-inductance Ld and the q-axis self-inductance Lq, as parameters related to the d-axis proportionality constant and the q-axis proportionality constant; when the controller outputs voltage application commands to the three-phase windings of the two systems, the current control device sets the d-axis proportionality constant and the q-axis proportionality constant with [Ld+Md] and [Lq+Mq], respectively, as parameters. As a result, it is made possible to perform high-accuracy control without being affected by noise and to reduce a torque ripple, a vibration, and a noise sound of the permanent-magnet synchronous motor. Moreover, even in the case where the motor rotates at high speed and hence the frequencies of motor currents of the respective phases are high, it is made possible to perform control so that the motor current follows a motor current target value.

In an electric power steering apparatus according to the present invention, a motor control apparatus for controlling a permanent-magnet synchronous motor that generates assist torque for assisting steering by a vehicle driver has a d-axis current control device and a q-axis current control device, each of which calculates the voltage command by multiplying the difference between the motor current target value and the motor current by a proportionality constant; the current control device changes a parameter related to the proportionality constant, in accordance with the number of the systems to which the controller outputs a voltage application command; when the control unit outputs a voltage application command to the three-phase winding of one system, the current control device sets the d-axis self-inductance Ld and the q-axis self-inductance Lq, as parameters related to the d-axis proportionality constant and the q-axis proportionality constant; when the controller outputs voltage application commands to the three-phase windings of the two systems, the current control device sets the d-axis proportionality constant and the q-axis proportionality constant with [Ld+Md] and [Lq+Mq], respectively, as parameters. As a result, it is made possible that the permanent-magnet synchronous motor is controlled in a high-accuracy manner without being affected by noise and that a torque ripple, a vibration, and a noise sound of the permanent-magnet synchronous motor is reduced. Moreover, even in the case where the motor rotates at high speed and hence the frequencies of motor currents of the respective phases are high, it is made possible to perform control so that the motor current follows a motor current target value.

BEST MODE FOR CARRYING OUT THE INVENTION

Embodiment 1

Figure 1:
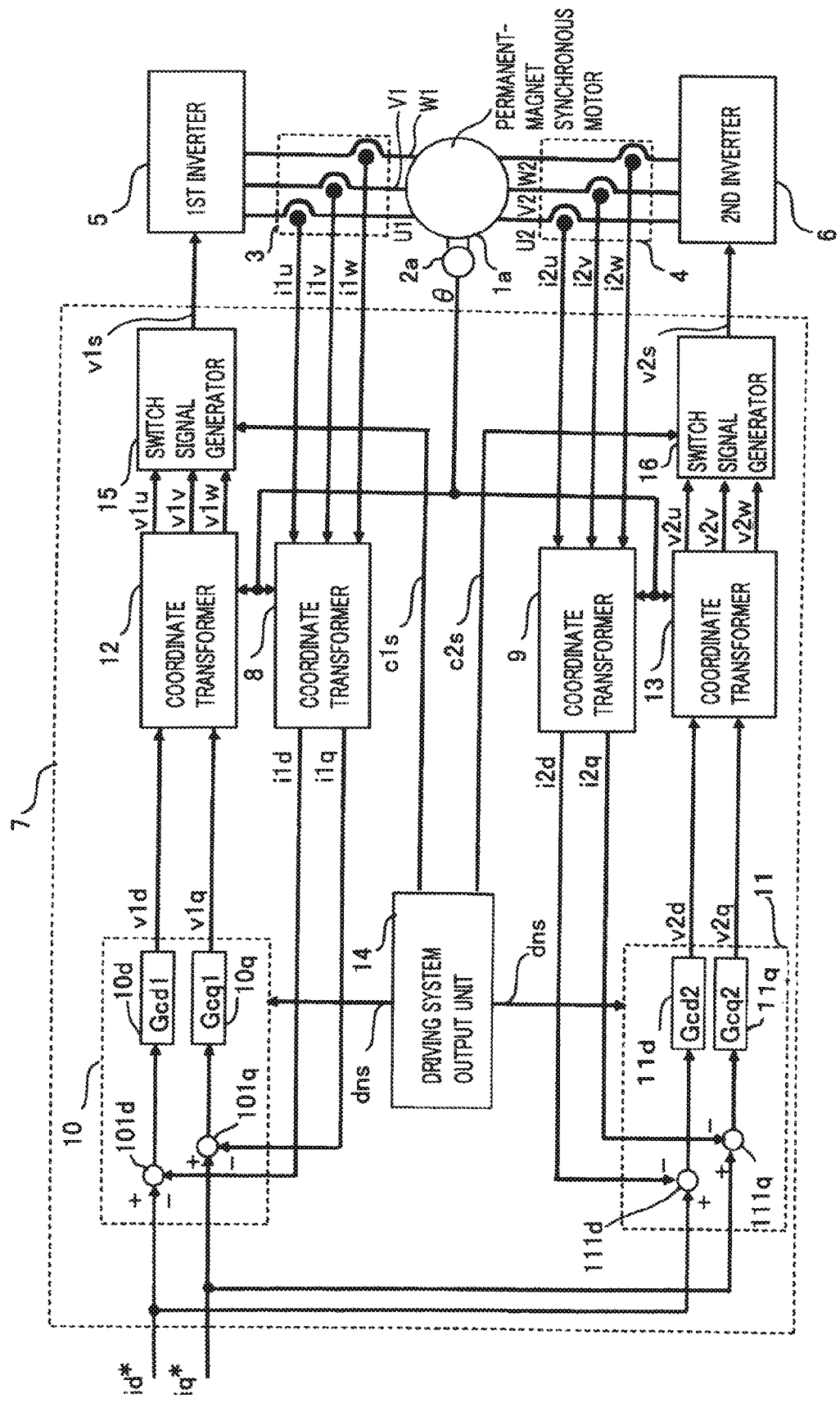
FIG. 1 is an overall configuration diagram representing a motor control apparatus according to Embodiment 1 of the present invention.
Figure 2:
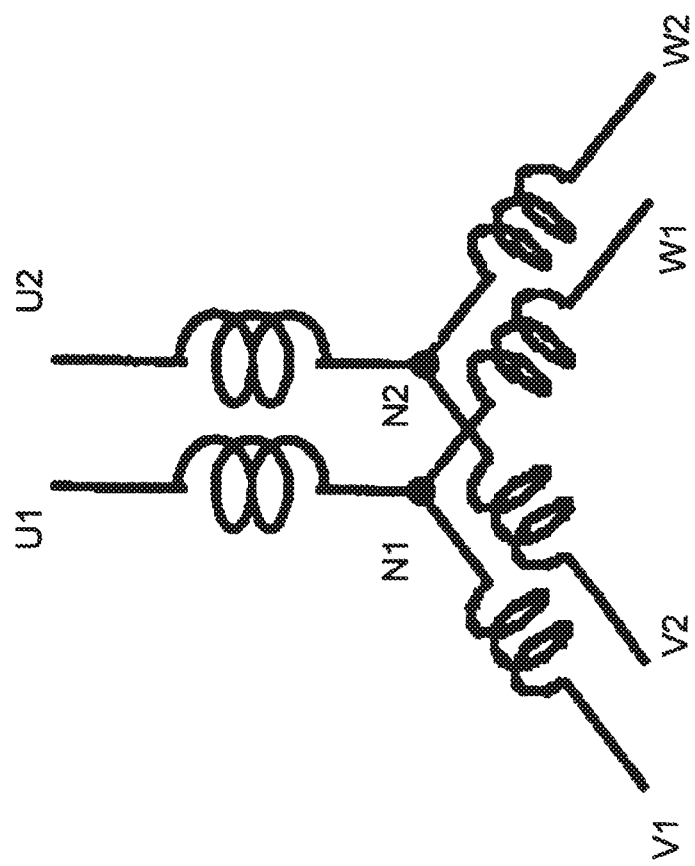
FIG. 2 is an explanatory view illustrating motor windings of a motor to be controlled by the motor control apparatus according to Embodiment 1 of the present invention.

FIG. 1 is an overall configuration diagram representing a motor control apparatus according to Embodiment 1 of the present invention; FIG. 2 is an explanatory view illustrating motor windings of a motor to be controlled by the motor control apparatus according to Embodiment 1 of the present invention. In FIG. 1, the stator of a permanent-magnet synchronous motor 1a has first three-phase windings U1, V1, and W1 that belong to a first system and second three-phase windings U2, V2, and W2 that belong to a second system; the rotor thereof has a permanent magnet. As illustrated in FIG. 2, the respective neutral points N1 and N2 of the first three-phase windings U1, V1, and W1 and the second three-phase windings U2, V2, and W2 are not connected with each other; both the first three-phase windings and the second three-phase windings are each independently contained in a single stator.

A rotation-position detection device 2a detects a rotor magnet pole position θ of the permanent-magnet synchronous motor 1a. Hereinafter, the magnetic-pole direction of the rotor will be referred to as the "d axis"; the axis having a phase difference of 90° (electric angle) from the d axis will be referred to as the "q axis". A current detector 3 detects motor currents i1u, i1v, i1w flowing in the first three-phase windings U1, V1, and W1, respectively, of the permanent-magnet synchronous motor 1a and then outputs the detection values to an after-mentioned control unit 7. A current detector 4 detects motor currents i2u, i2v, i2w flowing in the second three-phase windings U2, V2, and W2, respectively, of the permanent-magnet synchronous motor 1a and then outputs the detection values to the after-mentioned control unit 7.

A first inverter 5 applies voltages to the first three-phase windings U1, V1, and W1 of the permanent-magnet synchronous motor 1a, based on a first inverter control signal v1s outputted from the after-mentioned control unit 7. A second inverter 6 applies voltages to the second three-phase windings U2, V2, and W2 of the permanent-magnet synchronous motor 1a, based on a second inverter control signal v2s outputted from the after-mentioned control unit 7. The control unit 7 outputs the first inverter control signal v1s and the second inverter control signal v2s, based on motor current target values id* and iq* corresponding to the current target values of the permanent-magnet synchronous motor 1a.

Hereinafter, the control unit 7 as the controller 7 will be explained in detail. A coordinate transformer 8 performs coordinate transformation of the motor currents, based on the motor currents i1u, i1v, i1w in the first three-phase windings U1, V1, and W1, respectively, detected by the current detector 3 and the rotation angle θ detected by the rotation-position detection device 2a, and then outputs a d-axis-component motor current i1d and a q-axis-component motor current i1q for the first three-phase windings. A coordinate transformer 9 performs coordinate transformation of the motor currents, based on the motor currents i2u, i2v, i2w in the second three-phase windings U2, V2, and W2, respectively, detected by the current detector 4 and the rotation angle θ detected by the rotation-position detection device 2a, and then outputs a d-axis-component motor current i2d and a q-axis-component motor current i2q for the second three-phase windings.

A first current control device 10 is provided with a d-axis current controller 10d having a transfer characteristic Gcd1, a q-axis current controller 10q having a transfer characteristic Gcq1, a d-axis current subtractor 101d, and a q-axis current subtractor 101q. The d-axis current controller 10d calculates a d-axis-component voltage command v1d, based on a d-axis-component motor current target value id*, the d-axis-component motor current i1d, and a driving system number signal dns outputted from an after-mentioned driving system output unit 14. The q-axis current controller 10q calculates a q-axis-component voltage command v1q, based on a q-axis-component motor current target value iq*, the q-axis-component motor current i1q, and the driving system number signal dns outputted from the after-mentioned driving system output unit 14. The d-axis current subtractor 101d calculates the difference between the d-axis-component motor current target value id* and the d-axis-component motor current i1d and then inputs the difference to the d-axis current controller 10d. The q-axis current subtractor 101q calculates the difference between the q-axis-component motor current target value iq* and the q-axis-component motor current i1q and then inputs the difference to the q-axis current controller 10q.

A second current control device 11 is provided with a d-axis current controller 11d having a transfer characteristic Gcd2, a q-axis current controller 11q having a transfer characteristic Gcq2, a subtractor 111d, and a subtractor 111q. The d-axis current controller 11d calculates a d-axis-component voltage command v2d, based on the d-axis-component motor current target value id*, the d-axis-component motor current i2d, and the driving system number signal dns outputted from the after-mentioned driving system output unit 14. The q-axis current controller 11q calculates a q-axis-component voltage command v2q, based on the q-axis-component motor current target value iq*, the q-axis-component motor current i2q, and the driving system number signal dns outputted from the after-mentioned driving system output unit 14. The subtractor 111d calculates the difference between the d-axis-component motor current target value id* and the d-axis-component motor current i2d and then inputs the difference to the d-axis current controller 11d. The subtractor 111q calculates the difference between the q-axis-component motor current target value iq* and the q-axis-component motor current i2q and then inputs the difference to the q-axis current controller 11q.

Based on the voltage commands V1d and V1q outputted from the first current control device 10 and the rotation angle θ detected by the rotation-position detection device 2a, a coordinate transformer 12 performs coordinate transformation of the voltage commands and then outputs voltage commands v1u, v1v, and v1w for the first three-phase windings.

Based on the voltage commands V2d and V2q outputted from the second current control device 11 and the rotation angle θ detected by the rotation-position detection device 2a, a coordinate transformer 13 performs coordinate transformation of the voltage commands and then outputs voltage commands v2u, v2v, and v2w for the second three-phase windings.

The driving system output unit 14 outputs to a switching signal generator 15 a first inverter control signal c1s for outputting a voltage-application-on indication or a voltage-application-off indication to the first inverter 5; concurrently, the driving system output unit 14 outputs to a switching signal generator 16 a second inverter control signal c2s for outputting the voltage-application-on indication or the voltage-application-off indication to the second inverter 6; furthermore, the driving system output unit 14 outputs the driving system number signal dns, which indicates the number of driving systems, to the first current control device 10 and the second current control device 11.

In this situation, in the case where the driving system output unit 14 issues the voltage-application-on indication to both the first inverter control signal c1s and the second inverter control signal c2s, i.e., in the case where the driving system output unit 14 issues the voltage-application-on indication to both the first system including the first inverter 5 and the first three-phase windings U1, V1, and W1 and the second system including the second inverter 6 and the second three-phase windings U2, V2, and W2, the driving system output unit 14 outputs the driving system number "2", as the driving system number signal dns; when issuing the voltage-application-on indication only to any one of the first system and the second system, the driving system output unit 14 outputs the driving system number "1", as the driving system number signal dns.

It may be allowed that in the case where as one of the creation methods for the driving system number signal dns, the motor currents i1u, i1v, and i1w in the first system are inputted to the driving system output unit 14 and then the values thereof become abnormal, a voltage-application-off signal, as the first inverter control signal c1s, is provided and that in the case where the values thereof are not abnormal, a voltage-application-on signal is provided. The same is applied to the second inverter control signal c2s.

The switching signal generator 15 outputs the inverter control signal v1s for the first inverter 5, based on the voltage commands v1u, v1v, and v1w outputted from the coordinate transformer 12 and the first inverter control signal c1s outputted from the after-mentioned driving system output unit 14. The inverter control signal v1s differs depending on the kind of a power switching device included in the first inverter 5; in the case where the power switching device is formed of an IGBT or a MOS-FET, the inverter control signal v1s corresponds to a gate signal; in the case where the power switching device is formed of a bipolar transistor, the inverter control signal v1s corresponds to a base signal.

In the case where the first inverter control signal c1s is the voltage-application-on indication, the switching signal generator 15 outputs the inverter control signal v1s having a pulse width corresponding to the voltage commands v1u, v1v, and v1w. In contrast, in the case where the first inverter control signal c1s is the voltage-application-off indication, the switching signal generator 15 outputs the inverter control signal v1s for turning off all the power switching devices included in the first inverter 5, regardless of the voltage commands v1u, v1v, and v1w.

The switching signal generator 16 outputs the inverter control signal v2s for the second inverter 6, based on the voltage commands v2u, v2v, and v2w outputted from the coordinate transformer 13 and the second inverter control signal c2s outputted from the after-mentioned driving system output unit 14. The inverter control signal v2s differs depending on the kind of a power switching device included in the second inverter 6; in the case where the power switching device is formed of an IGBT or a MOS-FET, the inverter control signal v2s corresponds to a gate signal; in the case where the power switching device is formed of a bipolar transistor, the inverter control signal v2s corresponds to a base signal.

In the case where the second inverter control signal c2s is the voltage-application-on indication, the switching signal generator 16 outputs the inverter control signal v2s having a pulse width corresponding to the voltage commands v2u, v2v, and v2w. In contrast, in the case where the second inverter control signal c2s is the voltage-application-off indication, the switch signal generator 16 outputs the inverter control signal v2s for turning off all the power switching devices included in the second inverter 6, regardless of the voltage commands v2u, v2v, and v2w.

Next, a voltage equation on the dq axes of the permanent-magnet synchronous motor 1a is given by the equation (1) below.

$$\begin{bmatrix} v_{1d} \\ v_{1q} \\ v_{2d} \\ v_{2q} \end{bmatrix} = \begin{bmatrix} R+sL_d & -\omega L_q & sM_d & -\omega M_q \\ \omega L_d & R+sL_q & \omega M_d & sM_q \\ sM_d & -\omega M_q & R+sL_d & -\omega L_q \\ \omega M_d & sM_q & \omega L_d & R+sL_q \end{bmatrix} \begin{bmatrix} i_{1d} \\ i_{1q} \\ i_{2d} \\ i_{2q} \end{bmatrix} + \begin{bmatrix} 0 \\ \omega\phi \\ 0 \\ \omega\phi \end{bmatrix} \quad (1)$$

where s, Ld, Lq, Md, Mq, ω, and φ denote the Laplace operator, a d-axis self-inductance, a q-axis self-inductance, a d-axis mutual inductance, a q-axis mutual inductance, a motor rotation angular velocity, and a flux interlinkage number, respectively.

Based on the equation (1), the d-axis current controller 10d and the q-axis current controller 10q in the foregoing first current control device 10 and the d-axis current controller 11d and the q-axis current controller 11q in the second current control device 11 are configured.

In general, the response of a current control device is set to be sufficiently high in comparison with the velocity change bandwidth; thus, the term, of the equation (1), that includes the velocity (the term including the motor rotation angular velocity ω) can be neglected. Accordingly, when the term including the motor rotation angular velocity ω is removed from the equation (1), the equation (2) below is obtained.

$$\begin{bmatrix} v_{1d} \\ v_{1q} \\ v_{2d} \\ v_{2q} \end{bmatrix} = \begin{bmatrix} R+sL_d & 0 & sM_d & 0 \\ 0 & R+sL_q & 0 & sM_q \\ sM_d & 0 & R+sL_d & 0 \\ 0 & sM_q & 0 & R+sL_q \end{bmatrix} \begin{bmatrix} i_{1d} \\ i_{1q} \\ i_{2d} \\ i_{2q} \end{bmatrix} \quad (2)$$

When the equation (2) is expressed while being separated with respect to the d axis and the q axis, the equations (3) and (4) below are obtained.

$$\begin{bmatrix} v_{1d} \\ v_{2d} \end{bmatrix} = \begin{bmatrix} R+sL_d & sM_d \\ sM_d & R+sL_d \end{bmatrix} \begin{bmatrix} i_{1d} \\ i_{2d} \end{bmatrix} \quad (3)$$

$$\begin{bmatrix} v_{1q} \\ v_{2q} \end{bmatrix} = \begin{bmatrix} R+sL_q & sM_q \\ sM_q & R+sL_q \end{bmatrix} \begin{bmatrix} i_{1q} \\ i_{2q} \end{bmatrix} \quad (4)$$

Figure 3:
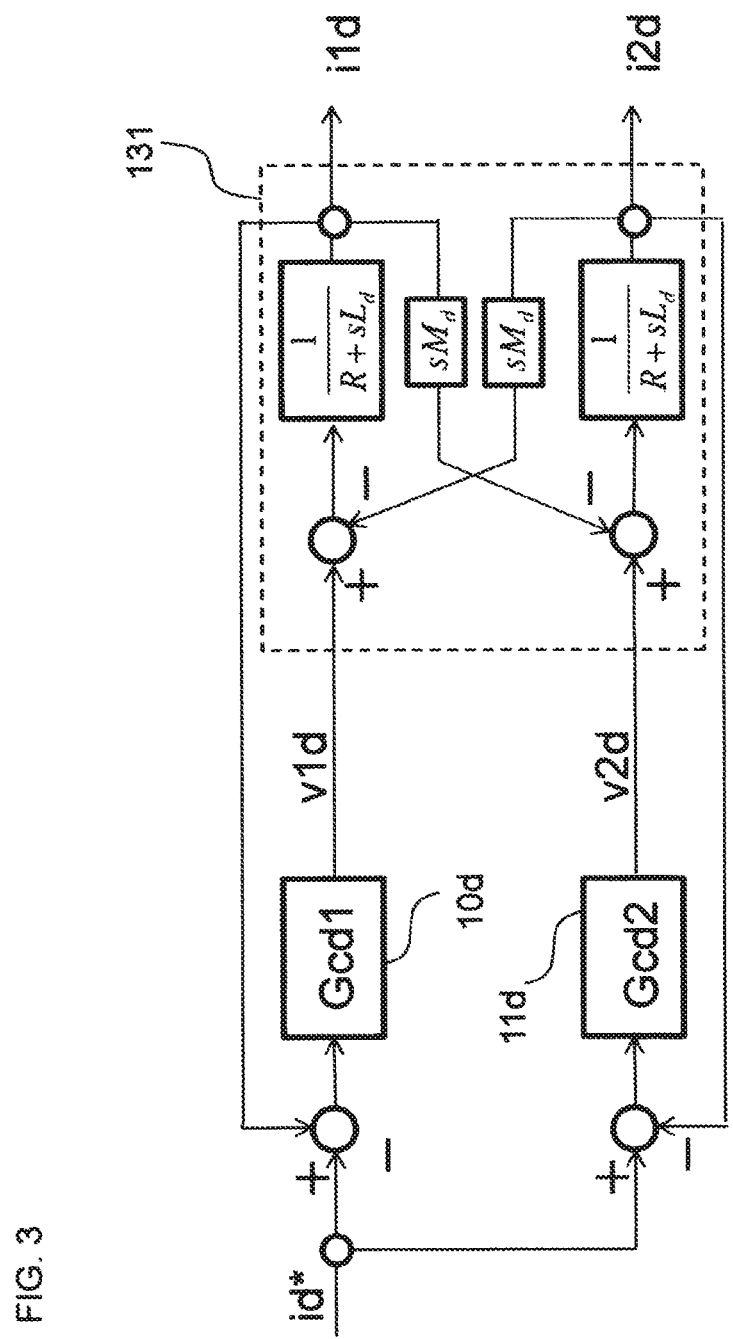
FIG. 3 is an explanatory diagram of the motor control apparatus according to Embodiment 1 of the present invention.
Figure 4:
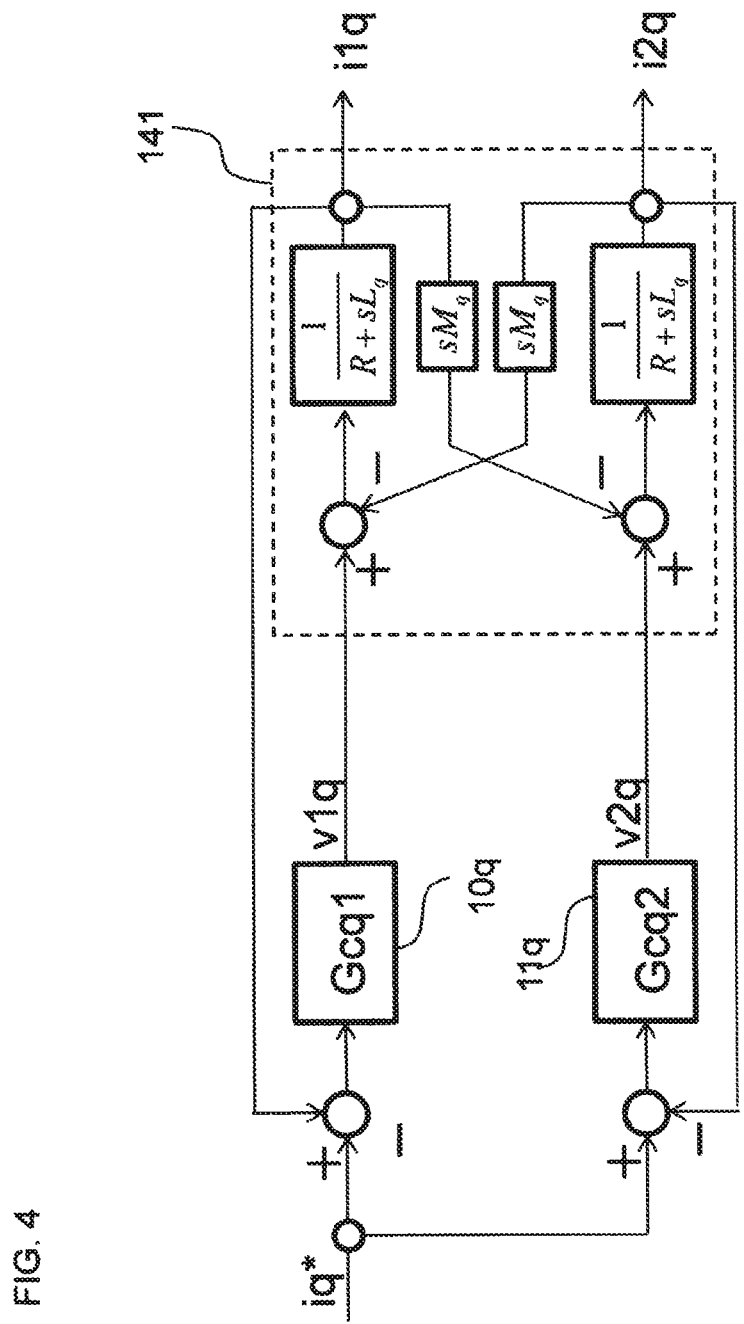
FIG. 4 is an explanatory diagram of the motor control apparatus according to Embodiment 1 of the present invention.

Each of FIGS. 3 and 4 is an explanatory diagram of the motor control apparatus according to Embodiment 1 of the present invention. When being expressed by a block diagram, the equation (3) can be expressed as a block 131 in FIG. 3. Similarly, when being expressed by a block diagram, the equation (4) can be expressed as a block 141 in FIG. 4.

The d-axis current control system in which the motor is integrated with the d-axis current controller 10d and the d-axis current controller 11d can be simulated as in FIG. 3. In this situation, when i1d and Gcd1 are set to i2d, and Gcd2, respectively, the transfer characteristic Gd from the motor current target value id* to the motor current i1d can be expressed by the equation (5) below. In the following explanation, the first current control device 10 will be explained; however, the explanation is applied also to the second current control device 11.

$$G_d = \frac{Gcd1 \cdot \frac{1}{R+s(L_d+M_d)}}{1 + Gcd1 \cdot \frac{1}{R+s(L_d+M_d)}} \quad (5)$$

The transfer characteristic Gcd1 of the d-axis current controller 10d for making Gd coincide with the first-order lag model with the current response frequency $f_{FB}$s [Hz] is given by the equation (6) below.

$$Gcd1 = \frac{R+s(L_d+M_d)}{\frac{1}{2\pi f_{FB}}s} \quad (6)$$

When the equation (6) is substituted for the equation (5), the transfer characteristic Gd from the motor current target value id* to the motor current i1d can be expressed by the equation (7) below.

$$G_d = \frac{1}{1 + \frac{1}{2\pi f_{FB}}s} \quad (7)$$

Accordingly, when the transfer characteristic Gcd1 of the d-axis current controller 10d is given by the equation (6), the transfer characteristic Gd from the motor current target value id* to the motor current i1d becomes the first-order lag system with the response frequency $f_{FB}$ [Hz].

Next, when the equation (6) is developed, the equation (8) below is obtained.

$$Gcd1 = \frac{L_d+M_d}{1/2\pi f_{FB}} + \frac{R}{1/2\pi f_{FB}} \frac{1}{s} \quad (8)$$

Accordingly, in the case where the d-axis current controller 10d is configured with a PI (proportionality+integration) controller, the first term at the right-hand side of the equation (8) may be set to a proportionality constant for the difference between the motor current target value id* and the motor current id and the second term, excluding the integration 1/s, at the right-hand side may be set to an integration constant for the difference between the motor current target value id* and the motor current id so that the transfer characteristic Gd is made to become the first-order lag model with the response frequency $f_{FB}$ [Hz]. Therefore, with regard to the proportionality constant of the d-axis current controller 10d, [Ld+Md] is set as a parameter, so that an optimum proportionality constant can be set in accordance with the response frequency $f_{FB}$ [Hz] to be set.

Similarly, as is clear from the comparison between the equations (3) and (4) or from the comparison between FIGS. 3 and 4, with regard to the q-axis current controller 10q in the first current control device 10 and the q-axis current controller 11q in the second current control device 11, when

[Ld+Md] in the equation (8) is replaced by [Lq+Mq], it is made possible to set an optimum proportionality constant in accordance with the response frequency $f_{FB}$ [Hz] to be set.

As described above, in the case where the voltage-application-on indication is issued to the two systems and currents are applied to the three-phase windings for the two systems, when with regard to the d-axis proportionality constant and the q-axis proportionality constant of the current control device, [Ld+Md] and [Lq+Mq], respectively, are set as the parameters, it is made possible to obtain a desired response frequency $f_{FB}$ [Hz].

Subsequently, the case where the driving system number signal dns outputted by the driving system output unit 14 is "1" will be described. As an example, there will be described the case where the voltage-application-on indication is outputted to the first inverter control signal c1s and the voltage-application-off indication is outputted to the second inverter control signal c2s. In this case, because all the inverter control signals for the second inverter 6 are off, no motor current is applied to the second three-phase windings U2, V2, and W2 (i2d=i2q=0); thus, the equation (2) can be modified to the equation (9) below. In this situation, because the second inverter 6 is controlled to turn off, the voltage (v2d, v2q) to be applied to the second three-phase windings U2, V2, and W2 are neglected.

$$\begin{bmatrix} v_{1d} \\ v_{1q} \end{bmatrix} = \begin{bmatrix} R+sL_d & 0 & sM_d & 0 \\ 0 & R+sL_q & 0 & sM_q \end{bmatrix} \begin{bmatrix} i_{1d} \\ i_{1q} \\ 0 \\ 0 \end{bmatrix} \quad (9)$$

When the equation (9) is expressed while being separated with respect to the d axis and the q axis, the equations (10) and (11) below are obtained.

$$v_{1d} = (R + sL_d) i_{1d} \quad (10)$$

$$v_{1q} = (R + SL_q) i_{1q} \quad (11)$$

Figure 5:
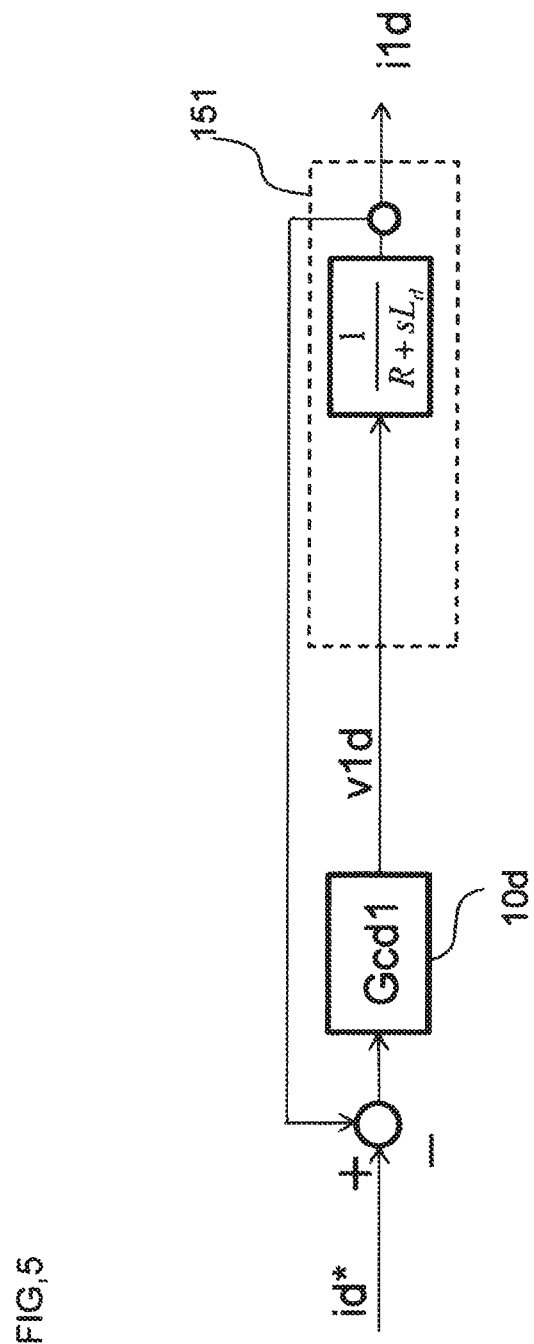
FIG. 5 is an explanatory diagram of the motor control apparatus according to Embodiment 1 of the present invention.
Figure 6:
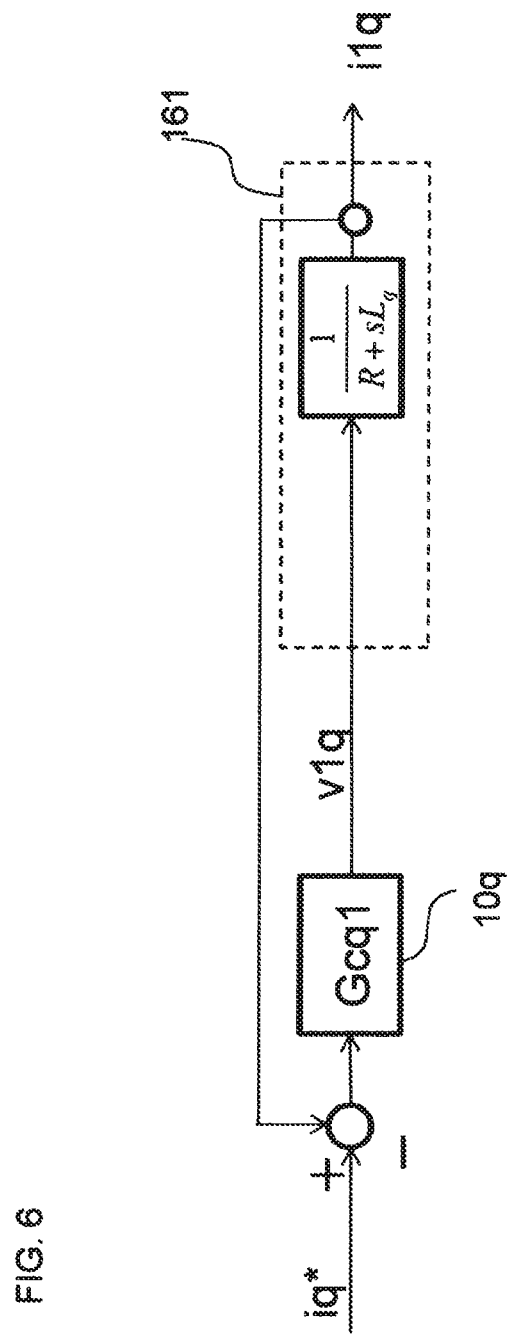
FIG. 6 is an explanatory diagram of the motor control apparatus according to Embodiment 1 of the present invention.

Each of FIGS. 5 and 6 is an explanatory diagram of the motor control apparatus according to Embodiment 1 of the present invention. When being expressed by a block diagram, the equation (10) can be expressed as a block 151 in FIG. 5. Similarly, when being expressed by a block diagram, the equation (11) can be expressed as a block 161 in FIG. 6.

The d-axis current control system in which the motor is integrated with the d-axis current controller can be simulated as in FIG. 5. In this situation, the transfer characteristic Gd from the motor current target value id* to the motor current i1d can be expressed by the equation (12) below.

$$G_d = \frac{Gcd1 \cdot \frac{1}{R+sL_d}}{1 + Gcd1 \cdot \frac{1}{R+sL_d}} \quad (12)$$

The transfer characteristic Gcd1 of the d-axis current controller 10d for making the transfer characteristic Gd coincide with the first-order lag model with the response frequency $f_{FB}$ [Hz] is given by the equation (13) below.

$$Gcd1 = \frac{R+sL_d}{\frac{1}{2\pi f_{FB}} s} \quad (13)$$

When the equation (13) is substituted for the equation (12), the transfer characteristic Gd from the motor current target value id* to the motor current i1d can be expressed by the equation (14) below.

$$G_d = \frac{1}{1 + \frac{1}{2\pi f_{FB}} s} \quad (14)$$

Accordingly, when the d-axis current controller 10d is given by the equation (13), the transfer characteristic Gd from the motor current target value id* to the motor current i1d becomes the first-order lag system with the response frequency $f_{FB}$. Next, when the equation (13) is developed, the equation (15) below is obtained.

$$Gcd1 = \frac{L_d}{1/2\pi f_{FB}} + \frac{R}{1/2\pi f_{FB}} \frac{1}{s} \quad (15)$$

Accordingly, in the case where the d-axis current controller 10d is configured with a PI (proportionality+integration) controller, the first term at the right-hand side of the equation (15) may be set to a proportionality constant for the difference between the motor current target value id* and the motor current i1d and the second term, excluding the integration 1/s, at the right-hand side may be set to an integration constant for the difference between the motor current target value id* and the motor current i1d so that the transfer characteristic Gd is made to become the first-order lag model with the response frequency $f_{FB}$ [Hz]. Therefore, with regard to the proportionality constant of the d-axis current controller 10d, the d-axis self-inductance Ld is set as a parameter, so that an optimum proportionality constant can be set in accordance with the response frequency $f_{FB}$ [Hz] to be set.

Similarly, as is clear from the comparison between the equations (10) and (11) or from the comparison between FIGS. 5 and 6, with regard to the q-axis current controller 10q, when the d-axis self-inductance Ld in the equation (13) is replaced by the q-axis self-inductance Lq, it is made possible to set an optimum proportionality constant in accordance with the response frequency $f_{FB}$ [Hz] to be set.

As described above, in the case where the voltage-application-on indication is issued to one system and a current is applied to the three-phase winding for the one system, when with regard to the d-axis proportionality constant and the q-axis proportionality constant of the current control device, the d-axis self-inductance Ld and the q-axis self-inductance Lq, respectively, are set as the parameters, it is made possible to obtain a desired response frequency $f_{FB}$ [Hz]. As is clear from the ratio of the first term at the right-hand side of the equation (15) to the first term at the right-hand side of the equation (8), in the case where it is desired to keep the current control response constant regardless of the number of driving systems, the d-axis proportional-gain parameter and the q-axis proportional-gain parameter at a time when the number of driving systems is "1" are set to be [Ld/(Ld+Md)] times as large as the d-axis proportional-gain parameter and [Lq/(Lq+Mq)] times as large as the q-axis proportional-gain parameter, respectively, at a time when the number of driving systems is "2", so that it is made possible to maintain the current control response.

Hereinafter, there will be explained an effect obtained by adopting the motor control apparatus according to Embodiment 1 of the present invention. In each of the motor control apparatus disclosed in Patent Document 1 and the motor control apparatus according to Embodiment 1 of the present invention, the control is performed in such a way as to feedback a motor current detected by the current detector to the current control device. In general, in many cases, the reference electric potentials (grounds) corresponding to 0 [A] in all the phases of a three-phase current detector are commonly set to the same electric potential and are electrically connected with one another. Accordingly, when pulsation is superimposed on the reference electric potential, noise of the same value (the same phase or zero-phase) is superimposed on the detection value of each of the three-phase currents. For example, it is assumed that the motor current detection values i1u, i1v, and i1w, including the in-phase observation noise signals, of the respective phases are given by the following equations (16), (17), and (18), respectively.

$$i_{1u} = -\frac{\sqrt{2}}{\sqrt{3}}(I_{amp}\sin(\theta) + I_{noise}) \qquad (16)$$

$$i_{1v} = -\frac{\sqrt{2}}{\sqrt{3}}\left(I_{amp}\sin\left(\theta - \frac{2\pi}{3}\right) + I_{noise}\right) \qquad (17)$$

$$i_{1w} = -\frac{\sqrt{2}}{\sqrt{3}}\left(I_{amp}\sin\left(\theta + \frac{2\pi}{3}\right) + I_{noise}\right) \qquad (18)$$

where Iamp and Inoise denote the current amplitude and the observation noise, respectively. The frequency of the observation noise Inoise is substantially several tens of herz through several kilohertz.

Because in Patent Document 1, the voltage command value is calculated by feeding back a current detection value including the observation noise Inoise, the voltage applied from the inverter includes the observation noise; therefore, a torque ripple, a vibration, and a noise sound are produced by the permanent-magnet synchronous motor.

Meanwhile, there will be explained the motor control apparatus, according to Embodiment 1 of the present invention, in which coordinate transformation onto the dq axes is performed. The following equations (19) and (20) are the definition equations of the d-axis motor current i1d and the q-axis motor current i1q on the rotating two axes.

$$i_{1d} = \frac{\sqrt{2}}{\sqrt{3}}\left(i_{1u}\cos\theta + i_{1v}\cos\left(\theta - \frac{2\pi}{3}\right) + i_{1w}\cos\left(\theta + \frac{2\pi}{3}\right)\right) \qquad (19)$$

$$i_{1q} = -\frac{\sqrt{2}}{\sqrt{3}}\left(i_{1u}\sin\theta + i_{1v}\sin\left(\theta - \frac{2\pi}{3}\right) + i_{1w}\sin\left(\theta + \frac{2\pi}{3}\right)\right) \qquad (20)$$

When the equations (16), (17), and (18) are substituted for the equations (19) and (20), the equations (21) and (22) below are obtained.

$$i_{1d} = 0 \qquad (21)$$

$$i_{1q} = I_{amp} \qquad (22)$$

Accordingly, the effect of the observation noise Inoise is eliminated by transforming the three-phase current detection values into the dq-axes currents, and because the dq-axes currents are fed back to the current control device, the effect of the observation noise appears neither in the voltage command value nor in the voltage applied from the inverter; thus, there is demonstrated an effect that the torque ripple, the vibration, and the noise sound produced by the permanent-magnet synchronous motor can be reduced.

In the motor control apparatus disclosed in Patent Document 1, because the three-phase-current feedback method is utilized, the control amount becomes an AC amount. Therefore, there exists a problem that when the permanent-magnet synchronous motor rotates at high speed, the frequency of the control amount also becomes high and hence it is not made possible that the control amount can be controlled so that the amplitude and the phase of a current become the same as the respective target values thereof; however, in Embodiment 1 of the present invention, because the motor current is coordinate-transformed into the currents on the rotating-coordinate system synchronized with the rotation angle θ of the permanent-magnet synchronous motor, the control amount becomes a DC amount; as a result, even when the motor rotates at high speed, it is made possible to make the motor current keep track of the motor current target value.

As described above, in the motor control apparatus according to Embodiment 1 of the present invention, there can be obtained an effect that the effect of noise included in the motor current is reduced and an effect that the control performance at a time when the permanent-magnet synchronous motor rotates at high speed is improved; furthermore, it is made possible to realize a motor control apparatus that can provide a desired current-control responsiveness.

Embodiment 2

Figure 7:
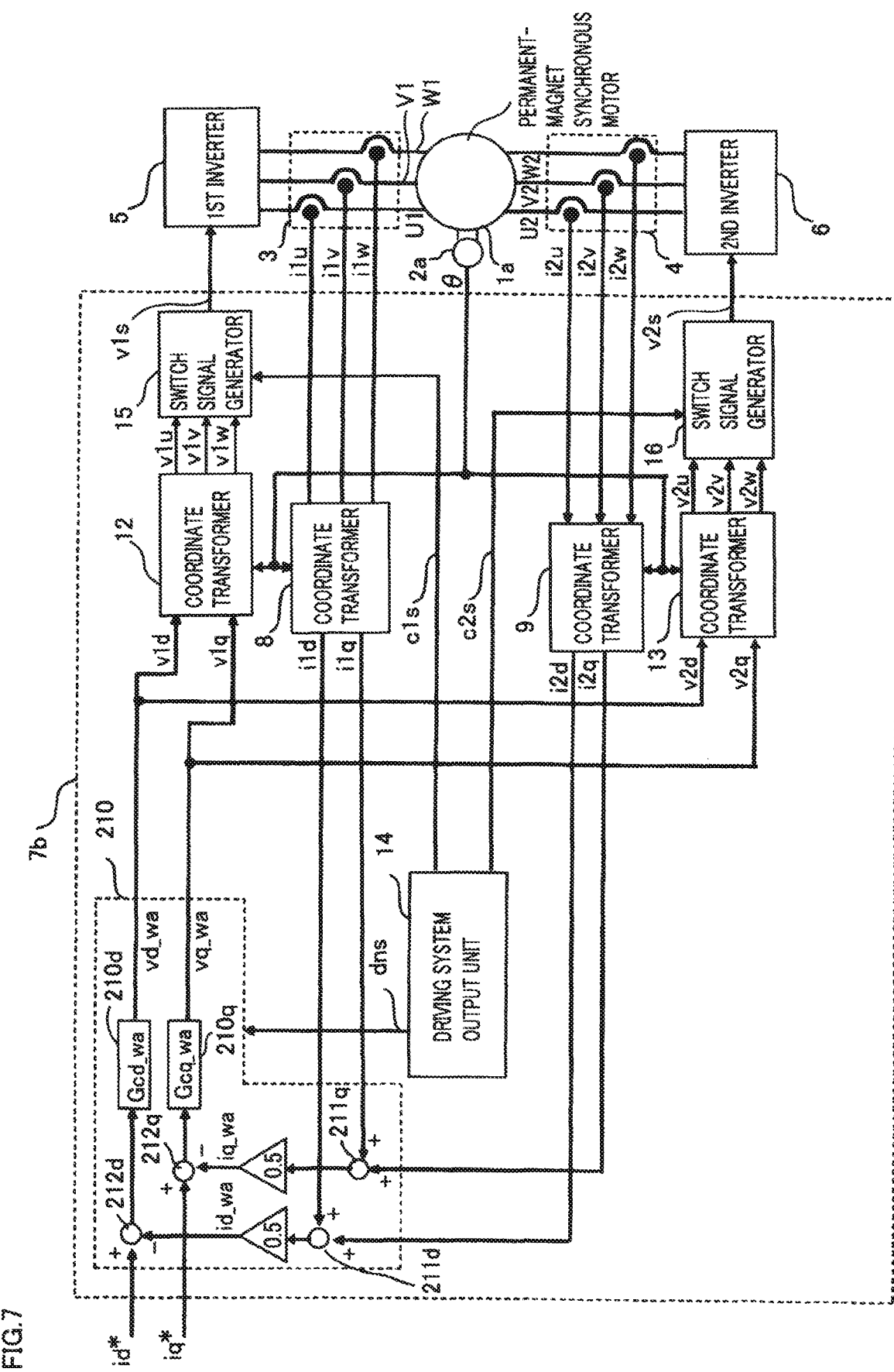
FIG. 7 is an overall configuration diagram representing a motor control apparatus according to Embodiment 2 of the present invention.

Next, there will be explained a motor control apparatus according to Embodiment 2 of the present invention. Embodiment 2 of the present invention differs from Embodiment 1 in the configuration where the driving system output unit 14 outputs "2", as the number of driving systems. In the following explanation, the difference from Embodiment 1 will mainly be explained. FIG. 7 is an overall configuration diagram representing the motor control apparatus according to Embodiment 2 of the present invention; FIG. 7 represents the case where the driving system output unit 14 outputs "2", as the driving system number signal dns. A control unit 7*b* as a controller 7*b* and a current control device 210 are different from those in Embodiment 1 represented in FIG. 1.

Hereinafter, the control unit 7*b* and the current control device 210 will be explained in detail. In FIG. 7, the coordinate transformer 8 performs coordinate transformation of the motor currents, based on the motor currents i1u, i1v, i1w in the first three-phase windings U1, V1, and W1, respectively, detected by the current detector 3 and the rotation angle θ detected by the rotation-position detection device 2*a*, and then outputs a d-axis-component motor current i1d and a q-axis-component motor current i1q for the first three-phase windings. The coordinate transformer 9 performs coordinate transformation of the motor currents, based on the motor currents i2u, i2v, i2w in the second three-phase windings U2, V2, and W2, respectively, detected by the current detector 4 and the rotation angle θ detected by the rotation-position detection device 2*a*, and then outputs a d-axis-component motor current i2d and a q-axis-component motor current i2q for the second three-phase windings.

The current control device 210 is provided with a d-axis current controller 210*d* having a transfer characteristic Gcd_wa, a q-axis current controller 210*q* having a transfer characteristic Gcq_wa, a d-axis current adder 211d, a q-axis current adder 211q, a d-axis current subtractor 212d, and a q-axis current subtractor 212q.

The d-axis current adder 211d adds the d-axis-component motor current i1d of the first system from the coordinate transformer 8 and the d-axis-component motor current i2d of the second system from the coordinate transformer 9, multiplies the addition value by "0.5" so as to calculate a d-axis-component motor current id_wa, and then inputs the d-axis-component motor current id_wa to the d-axis current subtractor 212d. The q-axis current adder 211q adds the q-axis-component motor current i1q of the first system from the coordinate transformer 8 and the q-axis-component motor current i2q of the second system from the coordinate transformer 9, multiplies the addition value by "0.5" so as to calculate a q-axis-component motor current iq_wa, and then inputs the q-axis-component motor current iq_wa to the q-axis current subtractor 212q.

The d-axis current subtractor 212d calculates the difference between the d-axis-component motor current target value id* and the d-axis-component motor current id_wa and inputs the difference to the d-axis current controller 210d. The q-axis current subtractor 212q calculates the difference between the q-axis-component motor current target value iq* and the q-axis-component motor current iq_wa and inputs the difference to the q-axis current controller 210q.

The d-axis current controller 210d calculates a d-axis-component voltage command vd_wa, based on the inputted difference between the motor current target value id* and the d-axis-component motor current id_wa and the driving system number signal dns outputted from the driving system output unit 14; then, the d-axis current controller 210d directly inputs the calculated d-axis-component voltage command vd_wa, as the d-axis-component voltage command v1d of the first system and the d-axis-component voltage command v2d of the second system, to the coordinate transformer 12 and the coordinate transformer 13, respectively.

The q-axis current controller 210q calculates a q-axis-component voltage command vq_wa, based on the inputted difference between the motor current target value iq* and the q-axis-component motor current iq_wa and the driving system number signal dns outputted from the driving system output unit 14; then, the q-axis current controller 210q directly inputs the calculated q-axis-component voltage command vq_wa, as the q-axis-component voltage command v1q of the first system and the q-axis-component voltage command v2q of the second system, to the coordinate transformer 12 and the coordinate transformer 13, respectively.

The foregoing d-axis-component motor current id_wa to be inputted to the foregoing d-axis current subtractor 212d is calculated based on the equation (23) below; the q-axis-component motor current iq_wa to be inputted to the q-axis current subtractor 212q is calculated based on the equation (24) below.

$$i_{d\_wa} = 0.5 \times (i_{1d} + i_{2d}) \quad (23)$$

$$i_{q\_wa} = 0.5 \times (i_{1q} + i_{2q}) \quad (24)$$

Next, there will be described the setting method for the transfer characteristic Gcd_wa of the d-axis current controller 210d and the transfer characteristic Gcq_wa of the q-axis current controller 210q in Embodiment 2 of the present invention. When the foregoing equation (2) is converted into the relationship between the voltage addition and the current addition, the equation (25) below is obtained.

$$\begin{bmatrix} v_{d\_wa} \\ v_{q\_wa} \end{bmatrix} = \begin{bmatrix} R + s(L_d + M_d) & 0 \\ 0 & R + s(L_q + M_q) \end{bmatrix} \begin{bmatrix} i_{d\_wa} \\ i_{q\_wa} \end{bmatrix} \quad (25)$$

When the equation (25) is expressed while being separated with respect to the d axis and the q axis, the equations (26) and (27) below are obtained.

$$v_{d\_wa} = (R + s(L_d + M_d))i_{d\_wa} \quad (26)$$

$$v_{q\_wa} = (R + s(L_q + M_q))i_{q\_wa} \quad (27)$$

Figure 8:
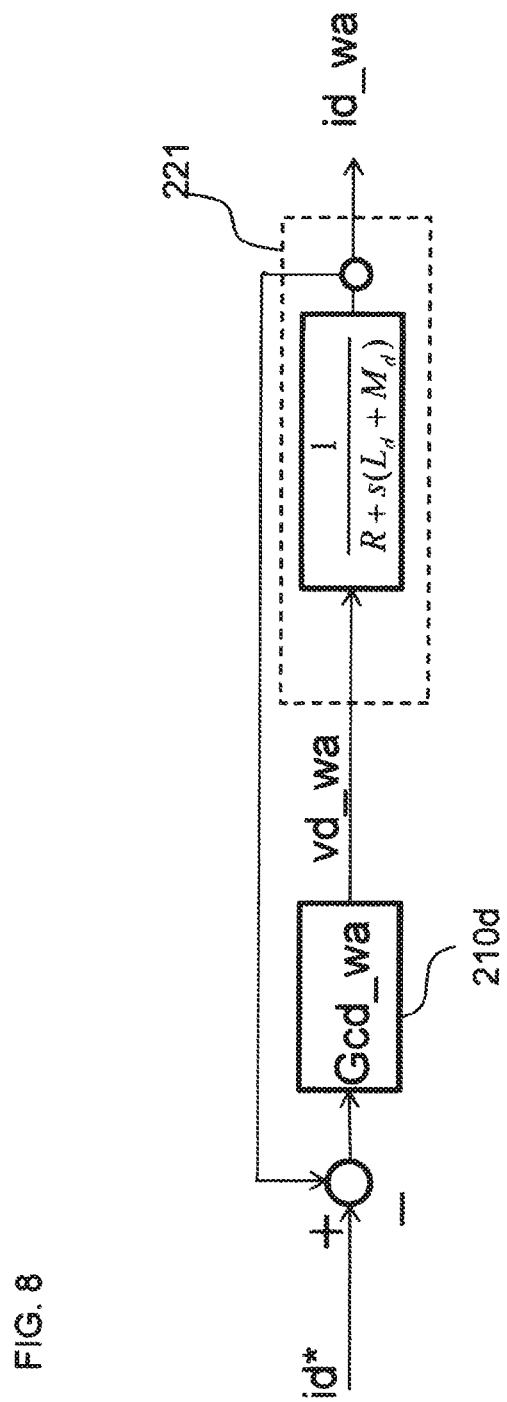
FIG. 8 is an explanatory diagram of the motor control apparatus according to Embodiment 2 of the present invention.
Figure 9:
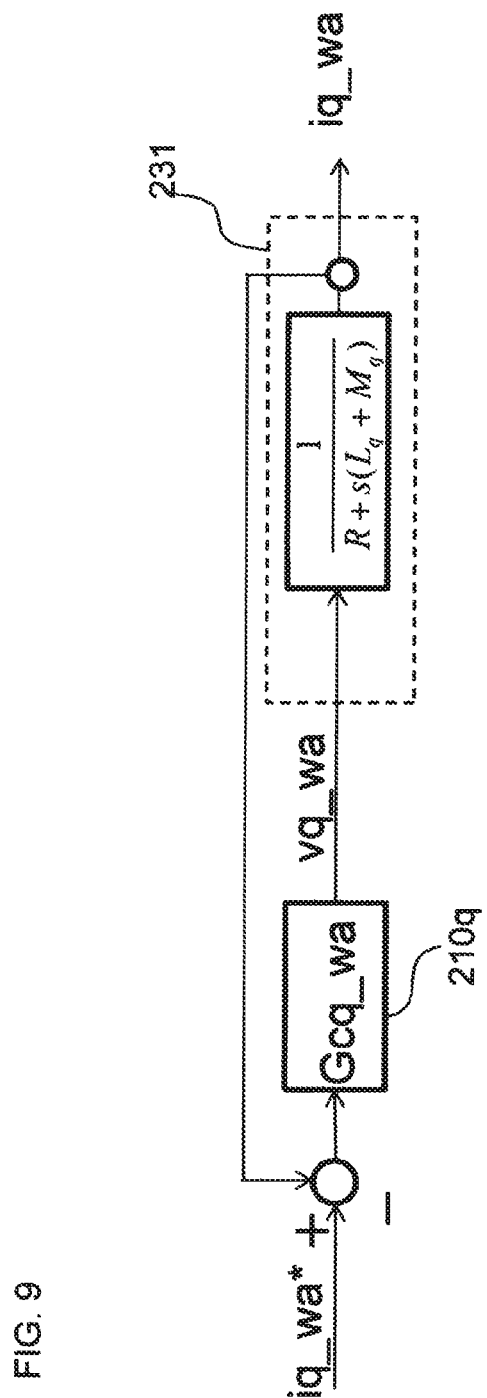
FIG. 9 is an explanatory diagram of the motor control apparatus according to Embodiment 2 of the present invention.

Each of FIGS. 8 and 9 is an explanatory diagram of the motor control apparatus according to Embodiment 2 of the present invention. When being expressed by a block diagram, the equation (26) can be expressed as a block 221 in FIG. 8. Similarly, when being expressed by a block diagram, the equation (27) can be expressed as a block 231 in FIG. 9.

Next, the d-axis current control system in which the permanent-magnet synchronous motor 1a is integrated with the d-axis current controller 210d can be simulated as in FIG. 5. In this situation, the transfer characteristic Gd_wa from the d-axis-component motor current target value id* to the d-axis-component motor current id_wa can be expressed by the equation (28) below.

$$G_{d\_wa} = \frac{Gcd\_wa \cdot \frac{1}{R + s(L_d + M_d)}}{1 + Gcd\_wa \cdot \frac{1}{R + s(L_d + M_d)}} \quad (28)$$

The transfer characteristic Gcd_wa of the d-axis current controller 210d for making the transfer characteristic Gd_wa correspond to the first-order lag model with the response frequency $f_{FB}$ [Hz] is given by the equation (29) below.

$$Gcd\_wa = \frac{R + s(L_d + M_d)}{\frac{1}{2\pi f_{FB}} s} \quad (29)$$

When the equation (28) is substituted for the equation (29), there can be obtained the equation (30) below representing the transfer characteristic Gd_wa from the d-axis-component motor current target value id* to the d-axis-component motor current id_wa.

$$G_{d\_wa} = \frac{1}{1 + \frac{1}{2\pi f_{FB}} s} \quad (30)$$

Accordingly, when the d-axis current controller 210d is given by the equation (29), the transfer characteristic Gd_wa from the d-axis-component motor current target value id* to the d-axis-component motor current id_wa becomes the first-order lag system with the response frequency $f_{FB}$ [Hz].

Next, when the equation (29) is developed, the equation (31) below is obtained.

$$Gcd\_wa = \frac{L_d + M_d}{1/2\pi f_{FB}} + \frac{R}{1/2\pi f_{FB}} \frac{1}{s} \quad (31)$$

Accordingly, in the case where the transfer characteristic Gcd_wa of the d-axis current controller 210*d* is configured with a PI (proportionality+integration) controller, the first term at the right-hand side of the equation (31) may be set to a proportionality constant for the difference between the d-axis-component motor current target value id* and the d-axis-component motor current id_wa and the second term, excluding the integration 1/s, at the right-hand side may be set to an integration constant for the difference between the d-axis-component motor current target value id* and the d-axis-component motor current id_wa so that the transfer characteristic Gd_wa is made to become the first-order lag model with the response frequency $f_{FB}$ [Hz].

Therefore, with regard to the proportionality constant of the d-axis current controller 210*d*, [Ld+Md] is set as a parameter, so that an optimum proportionality constant can be set in accordance with the response frequency $f_{FB}$ [Hz] to be set.

Similarly, as is clear from the comparison between the equations (26) and (27) or from the comparison between FIGS. 8 and 9, with regard to the q-axis current controller 210*q*, when [Ld+Md] in the equation (31) is replaced by [Lq+Mq], it is made possible to set an optimum proportionality constant in accordance with the response frequency $f_{FB}$ [Hz] to be set.

As described above, in the case where the voltage-application-on indication is issued to the two systems and currents are applied to the three-phase windings for the two systems, when with regard to the d-axis proportionality constant and the q-axis proportionality constant of the current control device, [Ld+Md] and [Lq+Mq], respectively, are set as the parameters, it is made possible that in the current control device based on the addition of the motor current in the first system and the motor current in the second system, a desired response frequency $f_{FB}$ [Hz] can be obtained.

As is clear from the ratio of the first term at the right-hand side of the equation (31) to the second term at the right-hand side of the equation (15), in the case where it is desired to keep the current control response constant regardless of the number of driving systems, the d-axis proportional-gain parameter and the q-axis proportional-gain parameter at a time when the number of driving systems is "1" are set to be [Ld/(Ld+Md)] times as large as the d-axis proportional-gain parameter and [Lq/(Lq+Mq)] times as large as the q-axis proportional-gain parameter, respectively, at a time when the number of driving systems is "2", so that it is made possible to maintain the current control response.

The effect of the motor control apparatus according to Embodiment 2 will be described in comparison with the effect of the motor control apparatus according to Embodiment 1. In Embodiment 1, as represented in FIGS. 3 and 4, due to the mutual inductances Md and Mq, the value obtained by multiplying the differential value of a current in one system by the mutual inductance is inputted, as an interference voltage, to the other system; thus, there exists a problem that when the response frequency $f_{FB}$ [Hz] is raised, an oscillation occurs. In contrast, in Embodiment 2, as represented in FIGS. 8 and 9, each of the transfer characteristic from the d-axis-component voltage command vd_wa to the d-axis-component motor current id_wa and the transfer characteristic from the q-axis-component voltage command vq_wa to the q-axis-component motor current iq_wa is expressed by a simple first-order lag system and hence no interference voltage exists; therefore, there is demonstrated an effect that the response frequency $f_{FB}$ [Hz] can be set high.

Embodiment 3

Figure 10:
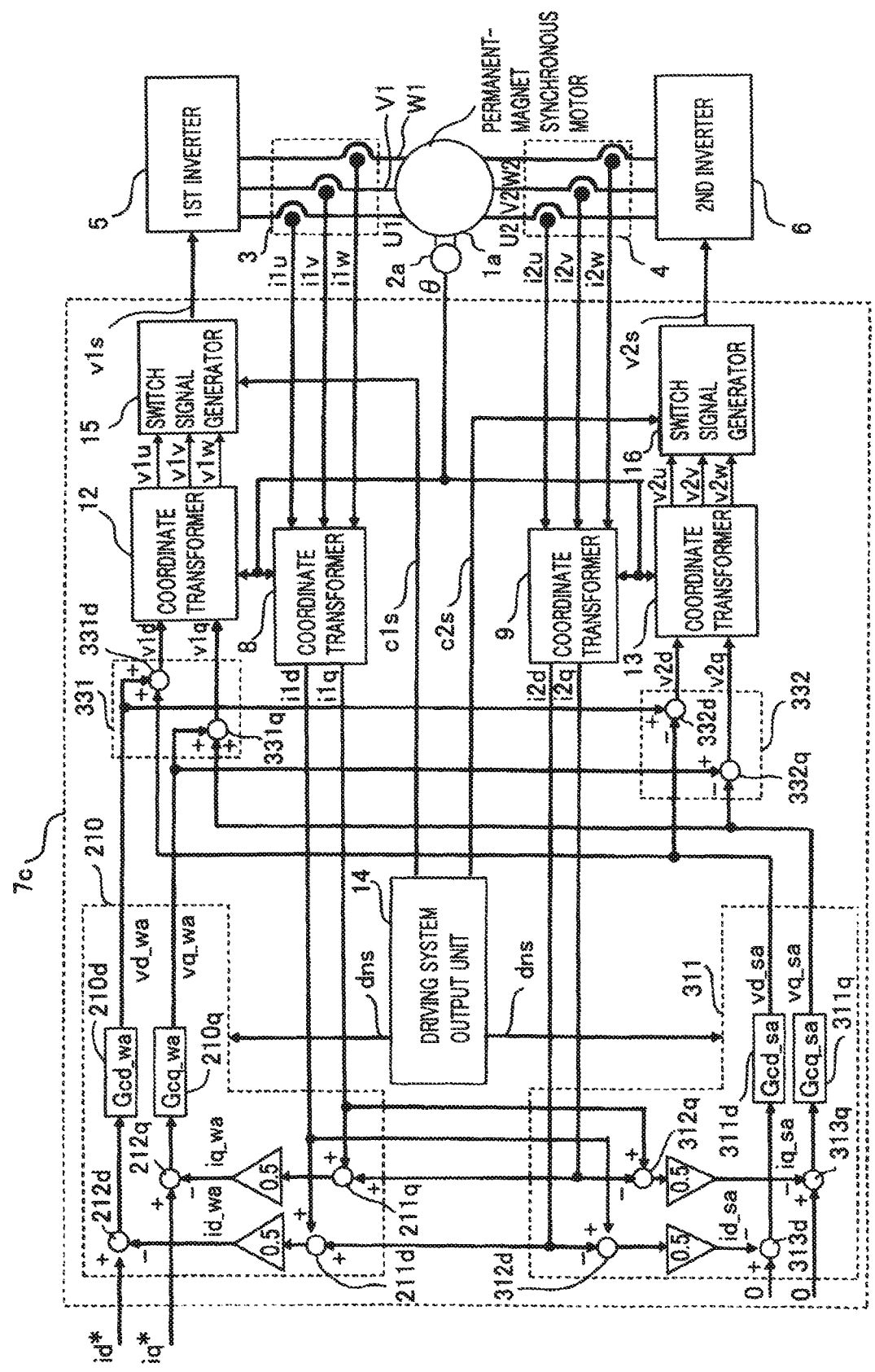
FIG. 10 is an overall configuration diagram representing a motor control apparatus according to Embodiment 3 of the present invention.

Next, there will be explained a motor control apparatus according to Embodiment 3 of the present invention. In Embodiment 3 of the present invention, a current control device based on the difference between the respective motor currents in the first system and the second system is added to Embodiment 2. In the following explanation, the difference from Embodiment 2 will mainly be explained. FIG. 10 is an overall configuration diagram representing a motor control apparatus according to Embodiment 3 of the present invention; the differences from Embodiment 2 are a control unit 7*c* as a controller 7*c*, a second current control device 311, an addition unit 331, and a subtraction unit 332.

In FIG. 10, the control unit 7*b* includes a first current control device 210, the second current control device 311, the addition unit 331, and the subtraction unit 332. The coordinate transformer 9 performs coordinate transformation of the motor currents, based on the motor currents i2*u*, i2*v*, i2*w* in the second three-phase windings U2, V2, and W2, respectively, detected by the current detector 4 and the rotation angle θ detected by the rotation-position detection device 2*a*, outputs a d-axis-component motor current i2*d* and a q-axis-component motor current i2*q* for the second three-phase windings, and then inputs the d-axis-component motor current i2*d* and the q-axis-component motor current i2*q* to the first current control device 210. The first current control device 210 is the same as the current control device 210 in Embodiment 2; therefore, the explanation therefor will be omitted.

In the addition unit 331, a d-axis voltage adder 331*d* adds the d-axis-component voltage command vd_wa calculated based on the sum of the d-axis-component motor currents of the respective systems, outputted from the foregoing current control device 210, with a d-axis-component voltage command vd_sa calculated based on the difference between the d-axis-component motor currents of the respective systems, outputted from the after-mentioned current control device 311; then, the d-axis voltage adder 331*d* inputs the addition value, as the d-axis-component voltage command v1*d* for the first system, to the coordinate transformer 12. A d-axis voltage adder 331*q* adds the q-axis-component voltage command vq_wa calculated based on the difference between the q-axis-component motor currents of the respective systems, outputted from the foregoing current control device 210, with a q-axis-component voltage command vq_sa calculated based on the difference between the q-axis-component motor currents of the respective systems, outputted from the after-mentioned current control device 311; then, the q-axis voltage adder 331*q* inputs the addition value, as the d-axis-component voltage command v1*q* for the first system, to the coordinate transformer 12.

In this situation, the addition unit 331 calculates the foregoing d-axis-component voltage command v1*d* for the first inverter 5 of the first system, based on the equation (32) below; the addition unit 331 calculates the foregoing q-axis-component voltage command v1*q* for the first inverter 5 of the first system, based on the equation (33) below.

$$v_{1d} = v_{d\_wa} + v_{d\_sa} \tag{32}$$

$$v_{1q} = v_{q\_wa} + v_{q\_sa} \tag{33}$$

In the subtraction unit 332, a d-axis voltage subtractor 332*d* subtracts the d-axis-component voltage command vd_sa calculated based on the difference between the d-axis-component motor currents of the respective systems, outputted from the after-mentioned current control device 311, from the d-axis-component voltage command vd_wa calculated based on the sum of the d-axis-component motor currents of the respective systems, outputted from the foregoing current control device 210; then, the d-axis voltage subtractor 332*d* inputs the subtraction value, as the d-axis-component voltage command v2*d* for the second system, to the coordinate transformer 13. A q-axis voltage subtractor 332*q* subtracts the q-axis-component voltage command vq_sa calculated based on the difference between the q-axis-component motor currents of the respective systems, outputted from the after-mentioned current control device 311, from the q-axis-component voltage command vq_wa calculated based on the difference between the q-axis-component motor currents of the respective systems, outputted from the foregoing current control device 210; then, the q-axis voltage subtractor 332*q* inputs the subtraction value, as the q-axis-component voltage command v2*q* for the second system, to the coordinate transformer 13.

In this situation, the subtraction unit 332 calculates the foregoing d-axis-component voltage command v2*d* for the second inverter 6 of the second system, based on the equation (34) below; the subtraction unit 332 calculates the foregoing q-axis-component voltage command v2*q* for the second inverter 6 of the second system, based on the equation (35) below.

$$v_{2d} = v_{d\_wa} - v_{d\_sa} \tag{34}$$

$$v_{2q} = v_{q\_wa} - v_{q\_sa} \tag{35}$$

Next, the second current control device 311 will be explained. The second current control device 311 is provided with a d-axis current controller 311*d* having a transfer characteristic Gcd_sa, a q-axis current controller 311*q* having a transfer characteristic Gcq_sa, a d-axis current subtractor 312*d* that subtracts the d-axis-component motor currents of the respective systems, a q-axis current subtractor 312*q* that subtracts the q-axis-component motor currents of the respective systems, a d-axis current difference subtractor 313*d* that, as described later, calculates the difference between the output of the d-axis current subtractor 312*d* and "0" and then inputs the difference to the d-axis current controller 311*d*, and a q-axis current difference subtractor 313*q* that, as described later, calculates the difference between the output of the q-axis current subtractor 312*q* and "0" and then inputs the difference to the q-axis current controller 311*q*.

The d-axis current subtractor 312*d* subtracts the d-axis-component motor current i2*d* of the second system from the coordinate transformer 9 from the d-axis-component motor current i1*d* of the first system from the coordinate transformer 8, multiplies the subtraction value by "0.5" so as to calculate a d-axis-component motor current id_sa, and then inputs the d-axis-component motor current id_sa to the d-axis current difference subtractor 313*d*. The q-axis current subtractor 312*q* subtracts the q-axis-component motor current i2*q* of the second system from the coordinate transformer 9 from the q-axis-component motor current i1*q* of the first system from the coordinate transformer 8, multiplies the subtraction value by "0.5" so as to calculate a q-axis-component motor current iq_sa, and then inputs the q-axis-component motor current iq_sa to the q-axis current difference subtractor 313*q*.

The d-axis current subtractor 312*d* calculates the d-axis-component motor current id_sa, based on the equation (36) below; the q-axis current subtractor 312*q* calculates the q-axis-component motor current iq_sa, based on the equation (37) below.

$$i_{d\_sa} = 0.5 \times (i_{1d} - i_{2d}) \tag{36}$$

$$i_{q\_sa} = 0.5 \times (i_{1q} - i_{2q}) \tag{37}$$

Next, the d-axis current difference subtractor 313*d* and the q-axis current difference subtractor 313*q* will be explained. In general, it is desirable that each of the difference between the d-axis motor currents of the respective systems and the difference between the q-axis motor currents of the respective systems is "0", i.e., it is desirable that no imbalance exists therebetween; therefore, it is desirable that each of the difference between the d-axis motor current target values of the respective systems and the difference between the q-axis motor current target values of the respective systems is "0". Accordingly, the d-axis current difference subtractor 313*d* calculates the difference between the d-axis-component motor current id_sa from the d-axis current subtractor 312*d* and "0" and then inputs the difference to the d-axis current controller 311*d*. Similarly, the q-axis current difference subtractor 313*q* calculates the difference between the q-axis-component motor current iq_sa from the q-axis current subtractor 312*q* and "0" and then inputs the difference to the q-axis current controller 311*q*.

Based on the transfer characteristic Gcd_sa, the d-axis current controller 311*d* performs proportional integration control of the d-axis current difference inputted from the d-axis current difference subtractor 313*d* so as to obtain a d-axis difference voltage vd_sa; then, the d-axis current controller 311*d* inputs the d-axis difference voltage vd_sa to the d-axis voltage adder 331*d* in the foregoing addition unit 331 and the d-axis voltage subtractor 332*d* in the foregoing subtraction unit 332. Based on the transfer characteristic Gcq_sa, the q-axis current controller 311*q* performs proportional integration control of the q-axis current difference inputted from the q-axis current difference subtractor 313*q* so as to obtain a q-axis difference voltage vq_sa; then, the q-axis current controller 311*q* inputs the q-axis difference voltage vq_sa to the q-axis voltage adder 331*q* in the foregoing addition unit 331 and the q-axis voltage subtractor 332*q* in the foregoing subtraction unit 332.

In this situation, there will be explained the setting methods for the transfer characteristic Gcd_sa of the d-axis current controller 311*d* and the transfer characteristic Gcq_sa of the q-axis current controller 311*q*. When the foregoing equation (2) is converted into the relationship between the difference between the voltage commands of the respective systems and the difference between the motor currents of the respective systems, the equation (38) below is obtained.

$$\begin{bmatrix} v_{d\_sa} \\ v_{q\_sa} \end{bmatrix} = \begin{bmatrix} R + s(L_d - M_d) & 0 \\ 0 & R + s(L_q - M_q) \end{bmatrix} \begin{bmatrix} i_{d\_sa} \\ i_{q\_sa} \end{bmatrix} \tag{38}$$

When the equation (38) is expressed while being separated with respect to the d axis and the q axis, the equations (39) and (40) below are obtained.

$$v_{d\_sa} = (R + s(L_d - M_d)) i_{d\_sa} \tag{39}$$

$$v_{q\_sa} = (R + s(L_q - M_q)) i_{q\_sa} \tag{40}$$

Figure 11:
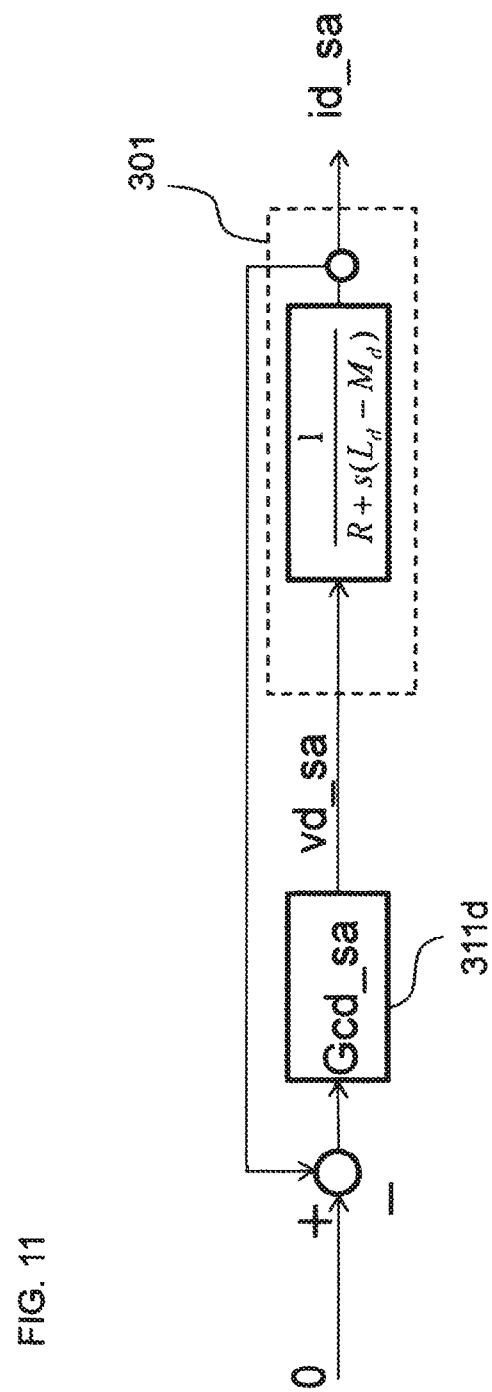
FIG. 11 is an explanatory diagram of the motor control apparatus according to Embodiment 3 of the present invention.
Figure 12:
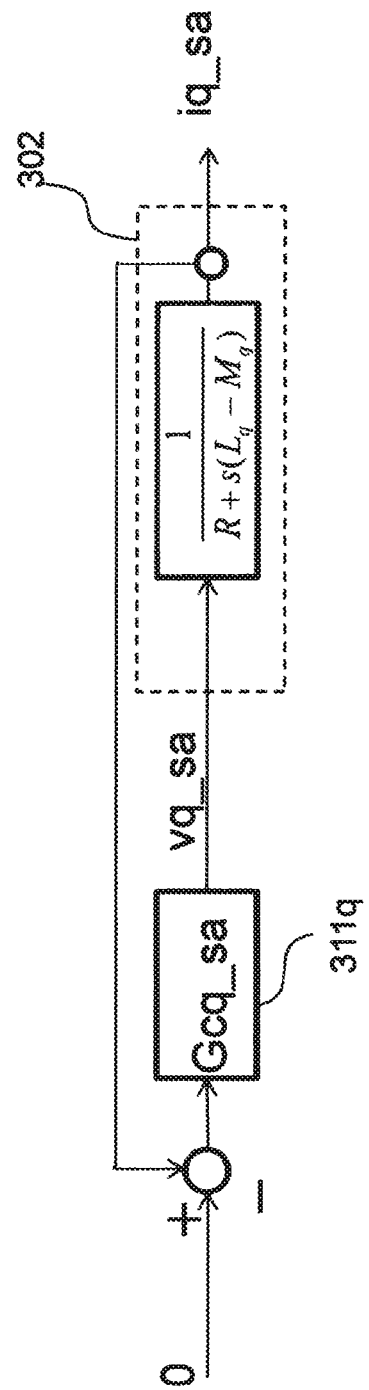
FIG. 12 is an explanatory diagram of the motor control apparatus according to Embodiment 3 of the present invention.

Each of FIGS. 11 and 12 is an explanatory diagram of the motor control apparatus according to Embodiment 3 of the present invention. When being expressed by a block diagram, the equation (39) can be expressed as a block 301 in FIG. 11. Similarly, when being expressed by a block diagram, the equation (40) can be expressed as a block 302 in FIG. 12.

Next, the d-axis current control system in which the motor 1a is integrated with the d-axis current controller 311d can be simulated as in FIG. 11. The transfer characteristic Gd_sa from "0" to id_sa can be expressed by the equation (41) below.

$$G_{d\_sa} = \frac{\text{Gcd\_sa} \cdot \frac{1}{R + s(L_d - M_d)}}{1 + \text{Gcd\_sa} \cdot \frac{1}{R + s(L_d - M_d)}} \quad (41)$$

The transfer characteristic Gcd_sa of the d-axis current controller 311d for making the transfer characteristic Gd_sa correspond to the first-order lag model with the response frequency $f_Fr$ [Hz] is given by the equation (42) below.

$$\text{Gcd\_sa} = \frac{R + s(L_d - M_d)}{\frac{1}{2\pi f_{FB}} s} \quad (42)$$

When the equation (42) is substituted for the equation (41), the transfer characteristic Gd_sa from "0" to id_sa is given by the equation (43) below.

$$G_{d\_sa} = \frac{1}{1 + \frac{1}{2\pi f_{FB}} s} \quad (43)$$

Accordingly, when the d-axis current controller 311d is given by the equation (43), the transfer characteristic Gd_sa from "0" to id_sa becomes the first-order lag system with the response frequency $f_{FB}$ [Hz].

Next, when the equation (43) is developed, the equation (44) below is obtained.

$$\text{Gcd\_sa} = \frac{L_d - M_d}{1/2\pi f_{FB}} + \frac{R}{1/2\pi f_{FB}} \frac{1}{s} \quad (44)$$

Accordingly, in the case where the transfer characteristic Gcd_sa is configured with the d-axis current controller 311d, as a PI (proportionality+integration) controller, the first term at the right-hand side of the equation (44) may be set to a proportionality constant for the difference between the motor current target value and the motor current and the second term, excluding the integration 1/s, at the right-hand side may be set to an integration constant for the difference between the motor current target value and the motor current i1d so that the transfer characteristic Gd_sa is made to become the first-order lag model with the response frequency $f_{FB}$ [Hz]. Therefore, with regard to the proportionality constant of the d-axis current controller 311d, [Ld−Md] is set as a parameter, so that an optimum proportionality constant can be set in accordance with the current response frequency $f_{FB}$ [Hz] to be set.

Similarly, as is clear from the comparison between the equations (39) and (40) or from the comparison between FIGS. 11 and 12, with regard to the q-axis current controller 311q, when the transfer characteristic [Ld−Md] in the equation (44) is replaced by [Lq−Mq], it is made possible to set an optimum proportionality constant in accordance with the response frequency $f_{FB}$ [Hz] to be set.

As described above, in the case where the voltage-application-on indication is issued to the two systems and currents are applied to the three-phase windings for the two systems, when with regard to the d-axis proportionality constant and the q-axis proportionality constant of the current control device, [Ld−Md] and [Lq−Mq], respectively, are set as the parameters, it is made possible that in the current control device based on the difference between the motor current in the first system and the motor current in the second system, a desired response frequency $f_{FB}$ [Hz] can be obtained.

Next, the effect of the motor control apparatus according to Embodiment 3 will be described in comparison with the effect of the motor control apparatus according to foregoing Embodiment 2. With regard to the current control device in Embodiment 2, there is provided only a current control device that outputs the sum of the voltage commands of the respective systems for the sum of the motor currents of the respective systems; thus, it is not taken into account that, for example, in the case where the impedance of the permanent-magnet synchronous motor differs depending on the system, there exists an imbalance between the motor currents of the respective systems. In contrast, in Embodiment 3, there is added a current control device that makes the difference between the motor currents of the respective systems coincide with a target value (in general, in order to cancel the imbalance, the target value is set to "0"); therefore, there is demonstrated an effect that at a desired response frequency $f_{FB}$ [Hz], the imbalance between the motor currents of the respective systems can be suppressed.

Embodiment 4

Next, there will be explained a motor control apparatus according to Embodiment 4 of the present invention. Embodiment 4 of the present invention differs from Embodiment 1 in a permanent-magnet synchronous motor 1b, a rotation-position detection device 2b, and coordinate transformers 9d and 13d in a control unit 7d as a controller 7d. In the following explanation, the difference from Embodiment 1 will mainly be explained.

Figure 13:
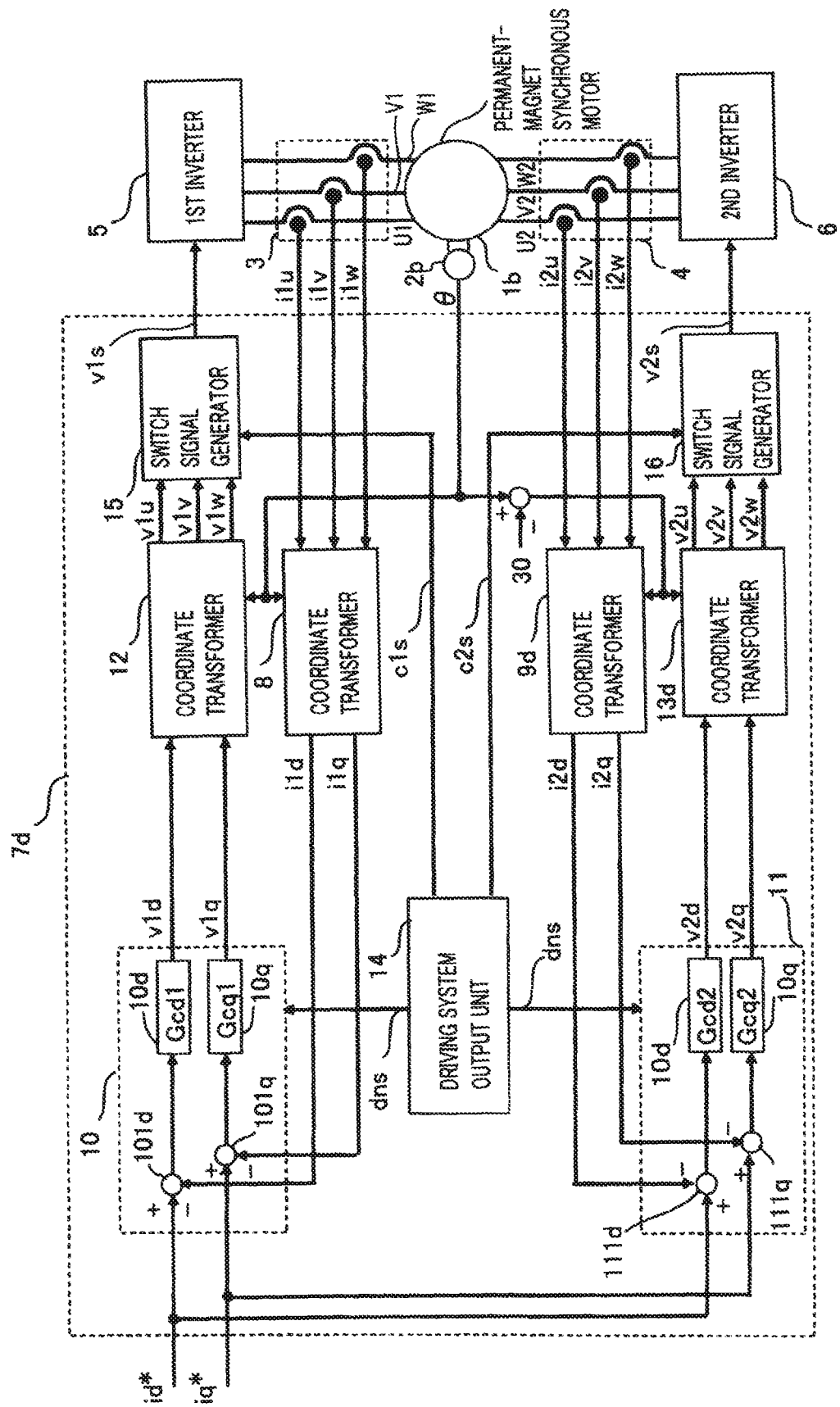
FIG. 13 is an overall configuration diagram representing a motor control apparatus according to Embodiment 4 of the present invention.
Figure 14:
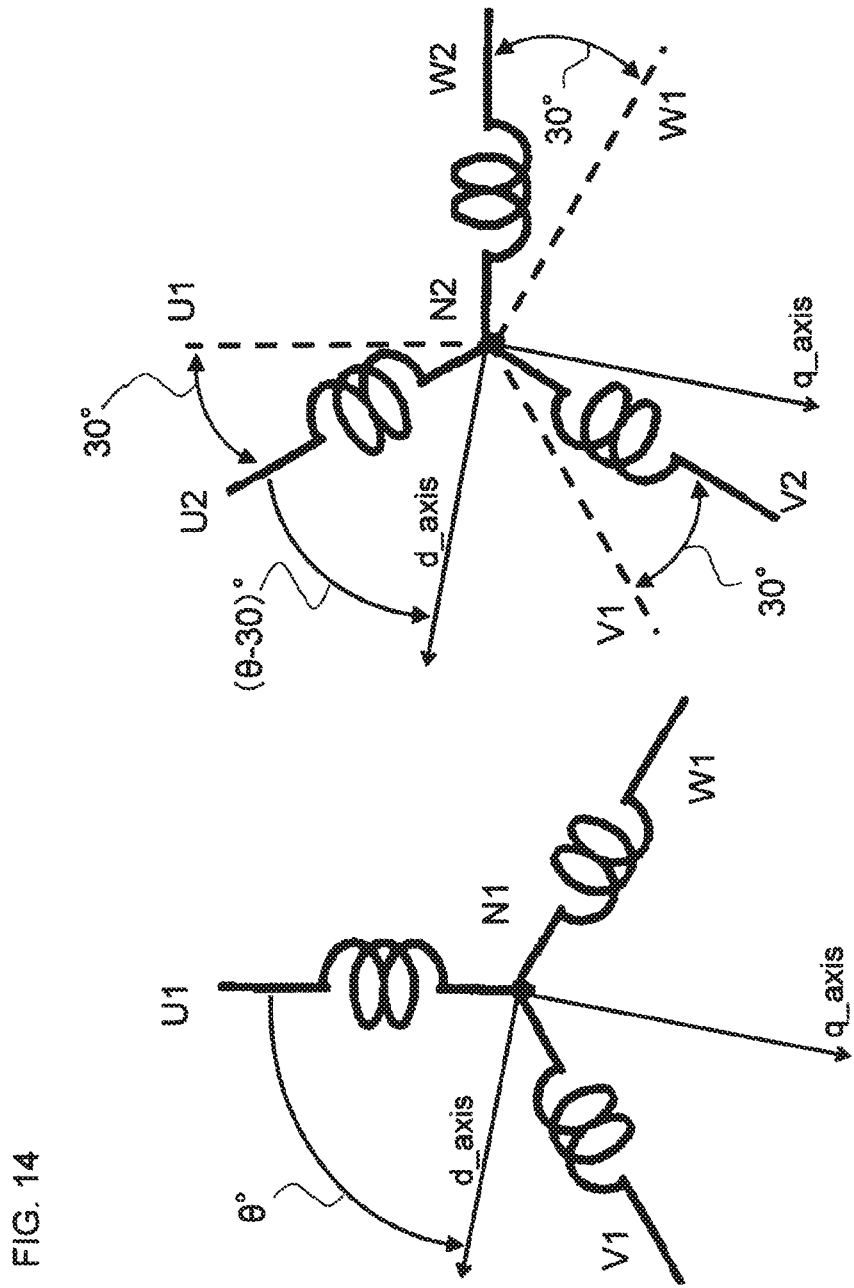
FIG. 14 is an explanatory view illustrating motor windings of a motor to be controlled by the motor control apparatus according to Embodiment 4 of the present invention.

FIG. 13 is an overall configuration diagram representing a motor control apparatus according to Embodiment 4 of the present invention. In FIG. 13, the permanent-magnet synchronous motor 1b has first three-phase windings U1, V1, and W1 and second three-phase windings U2, V2, and W2 in the stator and utilizes a permanent magnet in the rotor. FIG. 14 is an explanatory view illustrating the windings of a motor to be controlled by the motor control apparatus according to Embodiment 4 of the present invention. As illustrated in FIG. 14, the respective neutral points N1 and N2 of the first three-phase windings U1, V1, and W1 and the second three-phase windings U2, V2, and W2 are not connected with each other; both the first three-phase windings and the second three-phase windings are each contained in a single stator. The first three-phase windings U1, V1, and W1 and the second three-phase windings U2, V2, and W2 are arranged to be shifted from each other in such a way that there exists a phase difference of 30° (electric angle) between each of U1, V1, and W1 and each of U2, V2, and W2, respectively.

The rotation-position detection device 2b detects a rotor magnet pole position θ of the permanent-magnet synchronous motor 1b. In Embodiment 4, as illustrated in FIG. 14, θ denotes the rotation position of the d axis with respect to the first three-phase winding U1. Accordingly, the rotation position of the d axis with respect to the second three-phase winding U2 is [θ−30]°.

Subsequently, in FIG. 13 representing the overall configuration of the motor control apparatus according to Embodiment 4 of the present invention, the control unit 7d will be described. The control unit 7b is different from the control unit in foregoing Embodiment 1 in the coordinate transformer 9d and the coordinate transformer 13d. The coordinate transformer 9 performs coordinate transformation, based on the motor currents i2u, i2v, i2w detected by the current detector 4 and a value obtained by subtracting [30]° from the rotation angle θ detected by the rotation-position detection device 2b, and then outputs a d-axis-component motor current i2d and a q-axis-component motor current i2q for the second three-phase windings.

The coordinate transformer 9d performs coordinate transformation at [θ−30]°, so that the motor currents related to the second three-phase windings are transformed into the motor currents i2d and i2q on a coordinate system the same as the coordinate system for the motor currents i1d and i1q related to the first three-phase windings.

Based on voltage commands v2d* and v2q* outputted from the second current control device 11 and the value obtained by subtracting [30]° from the rotation angle θ detected by the rotation-position detection device 2b, the coordinate transformer 13d performs coordinate transformation, and then outputs voltage commands v2u, v2v, and v2w for the second three-phase windings.

In the permanent-magnet synchronous motor 1b, there exists a phase difference of [30]° between each of the first three-phase windings U1, V1, and W1 and each of the second three-phase windings U2, V2, and W2, respectively; however, when each of the coordinate transformation positions of the coordinate transformer 8 and the coordinate transformer 12 for the first three-phase windings belonging to the first system is made to differ by [30]° from each of the coordinate transformation positions of the coordinate transformer 9d and the coordinate transformer 13d for the second three-phase windings belonging to the second system, the motor application voltage and the motor current, which are physical quantities related to the first three-phase windings, and the motor application voltage and the motor current, which are physical quantities related to the second three-phase windings, are transformed into physical quantities on the same coordinates.

In Embodiment 4 of the present invention, both the physical quantity related to the first three-phase winding and the physical quantity related to the second three-phase winding are coordinate-transformed into those on the d-q-axes coordinates so that a current control system is configured. Accordingly, as is the case with the permanent-magnet synchronous motor 1a according to Embodiment 1, the voltage equation, on the d-q-axes coordinates, of the permanent-magnet synchronous motor 1b is given by the foregoing equation (1). Thus, the design of the current control device for the permanent-magnet synchronous motor 1b may be considered in the same manner in which the design of the current control device for the permanent-magnet synchronous motor 1a is considered.

In FIG. 13, in the case where the driving system output unit 14 outputs "2", as the number of driving systems, and the voltage-application-on indication is issued to the two systems and hence currents are applied to the three-phase windings for the two systems, it is made possible that each of the first current control device 10 and the second current control device 11 can obtain a desired response frequency $f_{FB}$ [Hz], when with regard to the d-axis proportionality constant and the q-axis proportionality constant, [Ld+Md] and [Lq+Mq], respectively, are set as the parameters.

In the case where the driving system output unit 14 outputs "1", as the number of driving systems, and the voltage-application-on indication is issued to the one system and hence currents are applied to the three-phase windings for the one system, it is made possible that the current control device can obtain a desired response frequency $f_{FB}$ [Hz], when with regard to the d-axis proportionality constant and the q-axis proportionality constant, Ld and Lq, respectively, are set as the parameters.

In Embodiment 4 of the present invention, there has been described the permanent-magnet synchronous motor in which there exists a phase difference of [30]° between the first three-phase winding and the second three-phase winding; however, it goes without saying that Embodiment 4 of the present invention can be applied to a permanent-magnet synchronous motor in which the phase difference is [30+60×n]° (n: integer).

In Patent Document 1, the parameters of the current control devices are determined by setting i1u to be equal to i2u and by assuming that the currents of the respective systems are in synchronization with each other. However, in the permanent-magnet synchronous motor in Embodiment 4 of the present invention, there exists a phase difference of [30]° between the first three-phase winding and the second three-phase winding; therefore, there exists also a phase difference of [30]° between the motor current related to the first three-phase winding and the motor current related to the second three-phase winding and hence i1u and i2u do not coincide with each other. Accordingly, it is difficult to apply the designing method for the parameter of the current control device in Patent Document 1 to a permanent-magnet synchronous motor in which there exists a phase difference between the first three-phase winding and the second three-phase winding. In contrast, in Embodiment 4 of the present invention, both the physical quantity related to the first three-phase winding and the physical quantity related to the second three-phase winding are coordinate-transformed into those on the d-q-axes coordinates so that a current control system is configured; therefore, it is made possible to directly apply the proportionality-constant parameters of the current control devices described in Embodiments 1 through 3 even to a permanent-magnet synchronous motor having the phase difference.

Embodiment 5

Next, an electric power steering apparatus according to Embodiment 5 of the present invention will be explained. In each of Embodiments 1 through 4, a motor control apparatus has been explained; it is made possible to configure an electric power steering apparatus that makes the motor control apparatus generate torque for assisting the steering torque. The electric power steering apparatus according to Embodiment 5 is configured by use of the motor control apparatus according to Embodiment 4.

Figure 15:
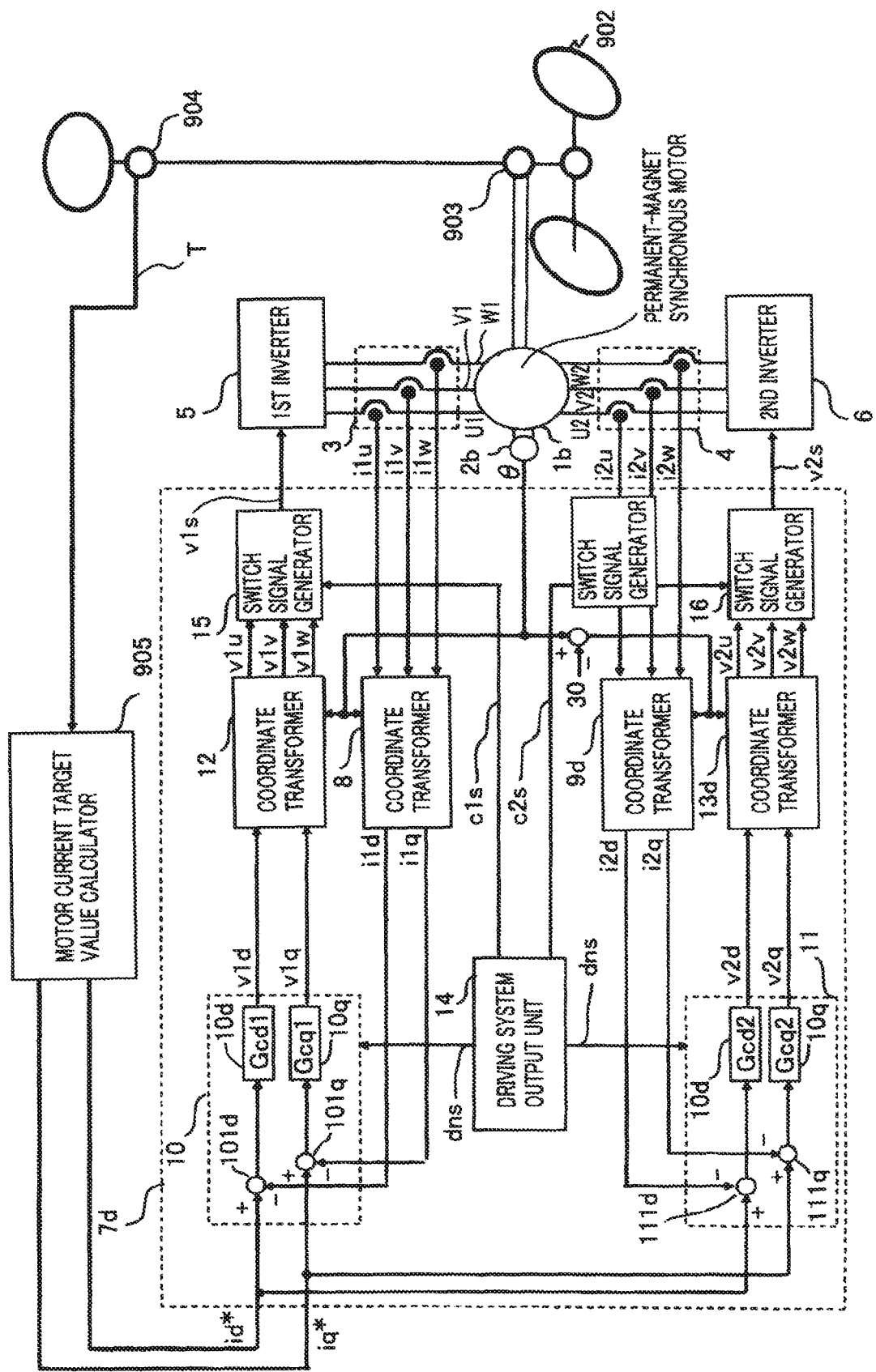
FIG. 15 is an overall configuration diagram representing an electric power steering apparatus according to Embodiment 5 of the present invention.

FIG. 15 is an overall configuration diagram representing the electric power steering apparatus according to Embodiment 5 of the present invention. In FIG. 15, the electric power steering apparatus has a handwheel 901, front wheels 902, a gear 903, a torque detector 904, and a motor current target value calculator 905. The other configurations are the same as those of the motor control apparatus according to Embodiment 4 represented in FIG. 13. In the following explanation, the difference from Embodiment 4 will mainly be explained.

A vehicle driver rotates the handwheel 901 leftward or rightward so as to perform steering with the front wheels 902. The torque detector 904 detects steering torque T of a steering system and outputs the detected torque T to the motor current target value calculator 905. Based on the torque detected by the torque detector 904, the motor current target value calculator 905 calculates the d-axis-component motor current target value id* and the q-axis-component motor current target value iq*, as the control commands to be outputted to the permanent-magnet synchronous motor 1b, so that the permanent-magnet synchronous motor 1b generates torque for assisting the steering torque T of the steering system. The permanent-magnet synchronous motor 1b generates torque for assisting the steering torque T, through the intermediary of the gear 903.

In the electric power steering apparatus configured in such a manner, setting of the proportionality constants in the transfer characteristics of the first current control device 10 and the second current control device 11 is very important. For example, when the proportionality constant is set low, the tracking capability of the motor current becomes low for the motor current target value that is determined by the motor current target value calculator 905, based on steering torque; therefore, the tracking capability of the assist torque in the permanent-magnet synchronous motor 1b is lowered and hence the feeling of steering is deteriorated. In contrast, when the proportionality constant is set high, the noise components that are included in the motor current target value, due to the noise components in the steering torque is included in the voltage command value; thus, there is posed a problem that a ripple, a vibration, and a noise sound occur in the permanent-magnet synchronous motor 1b. In an electric power steering apparatus, because of the foregoing reasons, it is very important to set the proportionality constant of the current control device.

In the electric power steering apparatus according to Embodiment 5, the driving system output unit 14 makes it possible that in accordance with the number of driving systems, there are appropriately set the proportionality constants for each of the first current control device 10 and the second current control device 11 to obtain a desired response frequency $f_{FB}$ [Hz]; therefore, there can be demonstrated an effect that the foregoing problems are not posed not only in the case where the number of systems for driving the permanent-magnet synchronous motor 1b is "2" but also in the case where the number of systems for driving the permanent-magnet synchronous motor 1b is "1".

The present invention is not limited to the respective motor control apparatuses according to foregoing Embodiments 1 through 4 and the electric power steering apparatus according to Embodiment 5; in the scope within the spirits of the present invention, the respective embodiments can appropriately be combined with one another, and the configurations thereof can partially be modified or partially be omitted.

INDUSTRIAL APPLICABILITY

The present invention can be applied to the field of a motor control apparatus for a motor such as a permanent-magnet synchronous motor, to the field of an electric power steering apparatus utilizing the motor control apparatus, and further to the field of a vehicle such as an automobile.

DESCRIPTION OF REFERENCE NUMERALS 1a, 1b: permanent-magnet synchronous motor
2a: rotation-position detection device
3: current detector
4: current detector
5: 1st inverter
6: 2nd inverter
7, 7b, 7c, 7d: control unit
8, 9, 9d, 12, 13, 13d: coordinate transformer
10: 1st current control device
11: 2nd current control device
10d, 11d, 210d, 311d: d-axis current controller
10q, 11q, 311q: q-axis current controller
14: driving system output unit
15, 16: switching signal generator

The invention claimed is:

1. A motor control apparatus for controlling a permanent-magnet synchronous motor having three-phase windings of two systems that are magnetically coupled with each other, the motor control apparatus comprising:
two respective inverters that are provided in the two systems and each of which converts DC electric power into AC electric power and applies a voltage to the three-phase winding of the system to which that inverter itself belongs;
a current detector that detects a motor current flowing in the three-phase winding; and
a controller that calculates a voltage command, based on the detected motor current and a motor current target value, and then controls the inverter by use of the calculated voltage command,
wherein letting a d axis, a q axis, Ld, Lq, Md, and Mq denote a direction of a rotor magnetic pole provided in a rotor of the permanent-magnet synchronous motor, a direction having a phase difference of 90° electric angle from the d axis, a d-axis self-inductance of the permanent-magnet synchronous motor, a q-axis self-inductance thereof, a d-axis inter-system mutual inductance, and a q-axis inter-system mutual inductance, respectively, the controller has a d-axis current control device and a q-axis current control device, each of which calculates the voltage command by multiplying the difference between the motor current target value and the motor current by a proportionality constant,
wherein the current control device changes a parameter related to the proportionality constant, in accordance with the number of the systems to which the controller outputs a voltage application command,
wherein when the controller outputs a voltage application command to the three-phase winding of one system, the current control device sets the d-axis proportionality constant and the q-axis proportionality constant with the d-axis self-inductance Ld and the q-axis self-inductance Lq, respectively, as parameters, and
wherein when the controller outputs voltage application commands to the three-phase windings of the two systems, the current control device sets the d-axis proportionality constant and the q-axis proportionality constant with [Ld+Md] and [Lq+Mq], respectively, as parameters.

2. The motor control apparatus according to claim 1, wherein the controller has respective current control device of the d axis and the q axis in each of the systems.

3. The motor control apparatus according to claim 2,
wherein when voltage application commands are outputted to the three-phase windings of the two systems, the controller performs setting in such a way that for each of the d axis and the q axis, each of the current control devices calculates the voltage command, based on the sum of respective motor currents of the two systems, and
wherein voltage application commands are outputted to the three-phase windings of one of the systems, the controller performs setting of the current control device for each of the d axis and the q axis of the one system.

4. The motor control apparatus according to claim 2, wherein when voltage application commands are outputted to the three-phase windings of one system, the controller sets the d-axis proportionality constant and the q-axis proportionality constant to be [Ld/(Ld+Md)] and [Lq/(Lq+Mq)], respectively, times as large as the d-axis proportionality constant and the q-axis proportionality constant at a time when voltage application commands are outputted to the three-phase windings of the two systems.

5. The motor control apparatus according to claim 2,
wherein when voltage application commands are outputted to the three-phase windings of the two systems, the controller performs setting in such a way that for each of the d axis and the q axis, each of the current control devices calculates the voltage command, based on the sum of respective motor currents of the two systems, and
wherein for each of the d axis and the q axis, the controller sets the current control device, based on the difference between respective motor currents of the two systems, and sets the d-axis proportionality constant and the q-axis proportionality constant with [Ld−Md] and [Lq−Mq], respectively, as parameters.

6. The motor control apparatus according to claim 2, wherein in the permanent-magnet synchronous motor, the three-phase windings of the two systems are arranged in such a way that there exists a phase difference of [30+60×n]° (n: integer) between the respective corresponding windings of the two systems.

7. An electric power steering apparatus comprising:
the motor control apparatus according to claim 2; and
a permanent-magnet synchronous motor that is controlled by the motor control apparatus and generates assist torque for assisting steering by a vehicle driver.

8. The motor control apparatus according to claim 1,
wherein when voltage application commands are outputted to the three-phase windings of the two systems, the controller performs setting in such a way that for each of the d axis and the q axis, each of the current control devices calculates the voltage command, based on the sum of respective motor currents of the two systems, and
wherein voltage application commands are outputted to the three-phase windings of one of the systems, the controller performs setting of the current control device for each of the d axis and the q axis of the one system.

9. The motor control apparatus according to claim 1, wherein when voltage application commands are outputted to the three-phase windings of one system, the controller sets the d-axis proportionality constant and the q-axis proportionality constant to be [Ld/(Ld+Md)] and [Lq/(Lq+Mq)], respectively, times as large as the d-axis proportionality constant and the q-axis proportionality constant at a time when voltage application commands are outputted to the three-phase windings of the two systems.

10. The motor control apparatus according to claim 1,
wherein when voltage application commands are outputted to the three-phase windings of the two systems, the controller performs setting in such a way that for each of the d axis and the q axis, each of the current control devices calculates the voltage command, based on the sum of respective motor currents of the two systems, and
wherein for each of the d axis and the q axis, the controller sets the current control device, based on the difference between respective motor currents of the two systems, and sets the d-axis proportionality constant and the q-axis proportionality constant with [Ld−Md] and [Lq−Mq], respectively, as parameters.

11. The motor control apparatus according to claim 1, wherein in the permanent-magnet synchronous motor, the three-phase windings of the two systems are arranged in such a way that there exists a phase difference of [30+60×n]° (n: integer) between the respective corresponding windings of the two systems.

12. An electric power steering apparatus comprising:
the motor control apparatus according to claim 1; and
a permanent-magnet synchronous motor that is controlled by the motor control apparatus and generates assist torque for assisting steering by a vehicle driver.

* * * * *